US011817889B2

(12) United States Patent
Song et al.

(10) Patent No.: US 11,817,889 B2
(45) Date of Patent: Nov. 14, 2023

(54) COMMUNICATION METHOD AND APPARATUS IN WIRELESS COMMUNICATION SYSTEM USING SATELLITE

(71) Applicants: Samsung Electronics Co., Ltd., Suwon-si (KR); KOREA UNIVERSITY RESEARCH AND BUSINESS FOUNDATION, Seoul (KR)

(72) Inventors: Seongkyu Song, Suwon-si (KR); Joonwoo Kim, Seoul (KR); Taeyun Kim, Seoul (KR); Sangheon Pack, Seoul (KR); Jaewook Lee, Seoul (KR); Jungsoo Jung, Suwon-si (KR)

(73) Assignees: Samsung Electronics Co., Ltd., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 175 days.

(21) Appl. No.: 17/529,831

(22) Filed: Nov. 18, 2021

(65) Prior Publication Data

US 2022/0416880 A1 Dec. 29, 2022

(30) Foreign Application Priority Data

Jun. 25, 2021 (KR) .......................... 10-2021-0083386

(51) Int. Cl.
*H04B 7/185* (2006.01)
*H04W 76/12* (2018.01)
*H04W 88/16* (2009.01)

(52) U.S. Cl.
CPC ........ *H04B 7/18513* (2013.01); *H04W 76/12* (2018.02); *H04W 88/16* (2013.01)

(58) Field of Classification Search
CPC ... H04B 7/18513; H04W 76/12; H04W 88/16
See application file for complete search history.

(56) References Cited

U.S. PATENT DOCUMENTS

2015/0124616 A1\* 5/2015 Lohman ............ H04W 28/0284
370/235

FOREIGN PATENT DOCUMENTS

KR 10-2020-0067091 A 6/2020

OTHER PUBLICATIONS

3GPP TR 23.737 V17.1.0; 3rd Generation Partnership Project; Technical Specification Group Services and System Aspects; Study on architecture aspects for using satellite access in 5G, (Release 17), Jul. 1, 2020.

\* cited by examiner

*Primary Examiner* — Jianye Wu
(74) *Attorney, Agent, or Firm* — Jefferson IP Law, LLP

(57) ABSTRACT

A communication method and an apparatus in a wireless communication system are provided. The communication method includes identifying, by a first satellite including a session management function within a space core network (SCN), a protocol data unit (PDU) session establishment request from a UE, selecting, by the first satellite, a satellite gateway for communicating with a ground gateway, and requesting, by the first satellite, the satellite gateway to allocate a port number which is matched to identification information of a first general packet radio service (GPRS) tunneling protocol-user (GTP-U) tunnel to be used for transmission and reception of packets for a PDU session requested by the UE in a path between a satellite base station which the UE accesses and the satellite gateway, wherein the packets are transmitted or received to and from a terrestrial
(Continued)

core network (TCN) by using address information which is converted based on the port number.

20 Claims, 26 Drawing Sheets

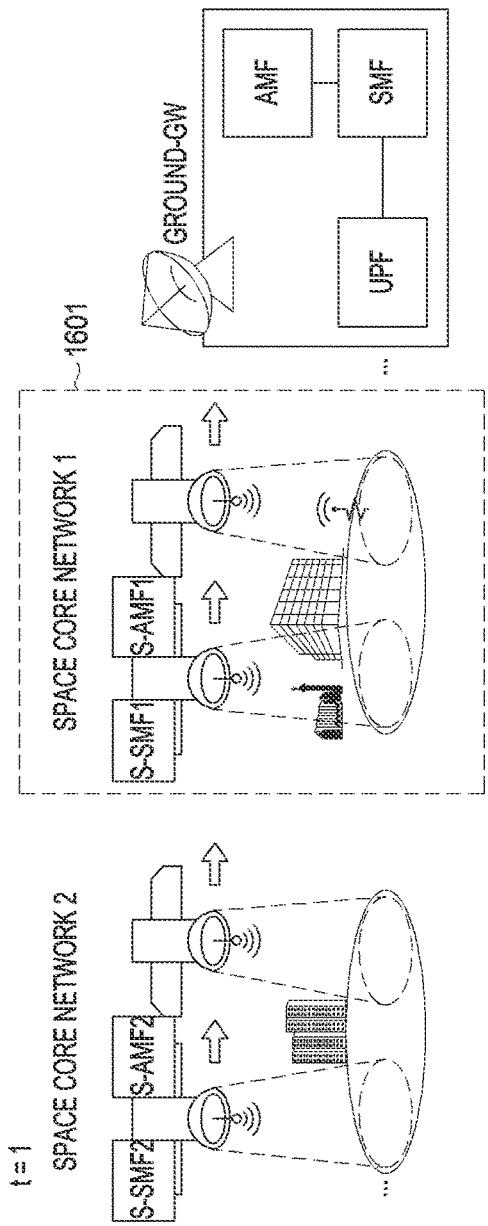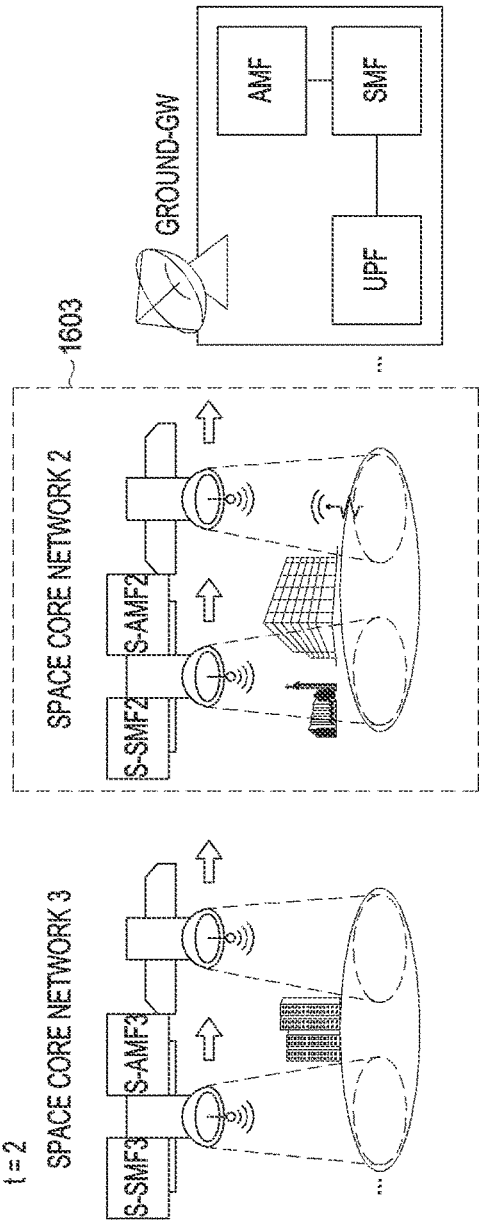

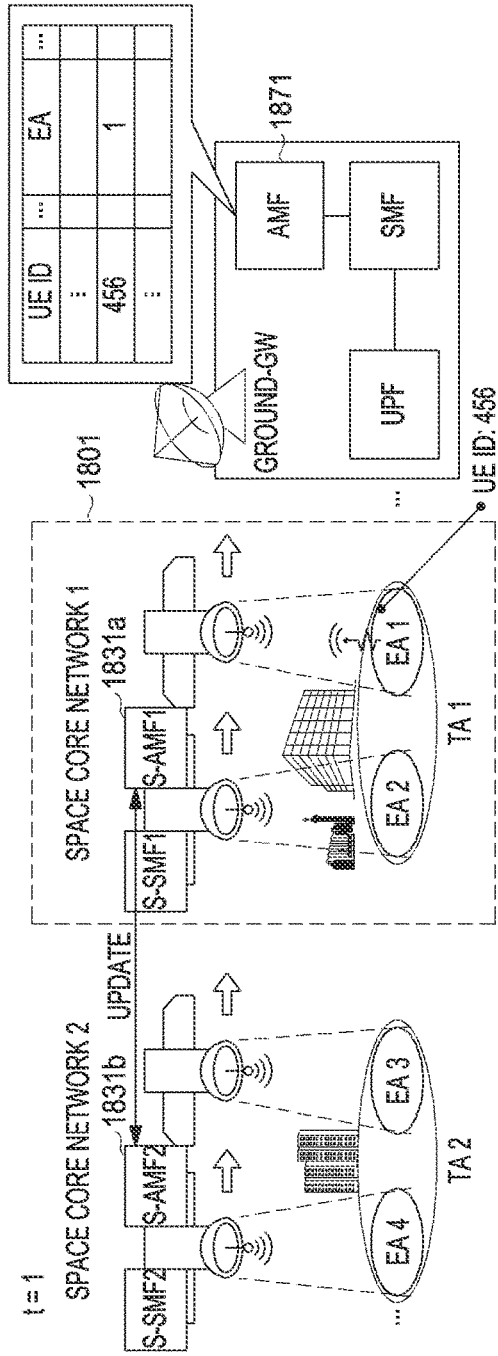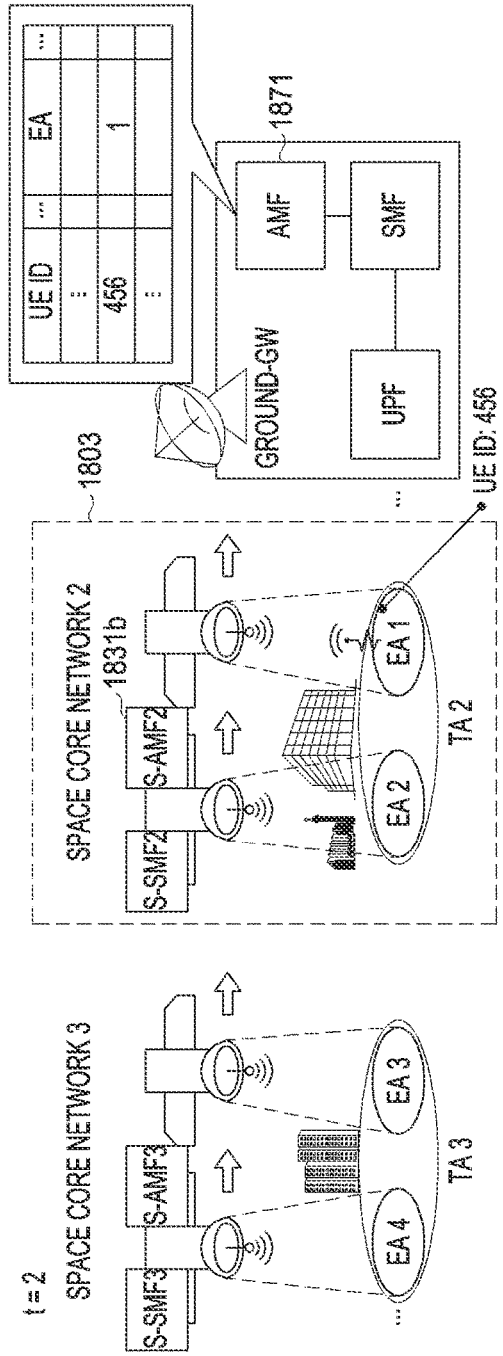
FIG. 18A
FIG. 18B

COMMUNICATION METHOD AND APPARATUS IN WIRELESS COMMUNICATION SYSTEM USING SATELLITE

CROSS-REFERENCE TO RELATED APPLICATION(S)

This application is based on and claims priority under 35 U.S.C. § 119(a) of a Korean patent application number 10-2021-0083386, filed on Jun. 25, 2021, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) Korea University Research and Business Foundation.

BACKGROUND

1. Filed

The disclosure relates to a communication method and apparatus in a wireless communication environment associated with a satellite.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies, such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems a full-duplex technology for enabling an uplink transmission and a downlink transmission to simultaneously use the same frequency resource at the same time, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services, such as truly immersive extended reality (XR), high-fidelity mobile hologram, and digital replica could be provided through 6G communication systems. In addition, services, such as remote surgery for security and reliability enhancement, industrial automation, and emergency response will be provided through the 6G communication system such that the technologies could be applied in various fields, such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and apparatus capable of reducing a delay in a wireless communication system using a satellite.

Another aspect of the disclosure is to provide a communication method and apparatus capable of reducing traffic overhead occurring when a control procedure is performed in a wireless communication system using a satellite.

Another aspect of the disclosure is to provide a communication method and apparatus for operating a space core network (SCN) in a wireless communication system using a satellite.

Additional aspects will be set forth in part in the description which follows and, in part, will be apparent from the description, or may be learned by practice of the presented embodiments.

In accordance with an aspect of the disclosure, a communication method in a wireless communication system using at least one satellite is provided. The communication method includes identifying, by a first satellite including a session management function within a space core network (SCN), a protocol data unit (PDU) session establishment request from a user equipment (UE), selecting, by the first satellite, a satellite gateway for communicating with a ground gateway, and requesting, by the first satellite, the satellite gateway to allocate a port number which is matched to identification information of a first general packet radio service (GPRS) tunneling protocol-user (GTP-U) tunnel to be used for transmission and reception of packets for a PDU session requested by the UE in a path between a satellite base station which the UE accesses and the satellite gateway, wherein the packets are transmitted or received to and from a terrestrial core network (TCN) by using address information which is converted based on the port number.

In accordance with another aspect of the disclosure, a communication method in a wireless communication system using at least one satellite is provided. The communication method includes receiving, by a satellite gateway for communicating with a ground gateway from a first satellite including a session management function within a space core network (SCN), an allocation request for a port number which is matched to identification information of a first general packet radio service (GPRS) tunneling protocol-user (GTP-U) tunnel to be used for transmission and reception of packets for a protocol data unit (PDU) session which is requested by a UE, and allocating the port number which is matched to a first source internet protocol (IP) address which corresponds to the identification information of the first GTP-U tunnel, wherein the satellite gateway manages a matching table including information in which the identification information of the first GTP-U tunnel is matched to the port number, wherein the first GTP-U tunnel is used in a path between a satellite base station which the UE accesses and the satellite gateway, and wherein the packets are transmitted or received to and from a terrestrial core network (TCN) by using address information which is converted based on the port number.

In accordance with another aspect of the disclosure, a satellite in a wireless communication system is provided. The satellite includes a transceiver, and a processor configured to identify a protocol data unit (PDU) session establishment request from a UE, select a satellite gateway for communicating with a ground gateway, and request, via the transceiver, the satellite gateway to allocate a port number which is matched to identification information of a first general packet radio service (GPRS) tunneling protocol-user (GTP-U) tunnel to be used for transmission and reception of packets for a PDU session requested by the UE in a path between a satellite base station which the UE accesses and the satellite gateway, wherein the satellite includes a session management function within a space core network (SCN), and the packets are transmitted or received to and from a terrestrial core network (TCN) by using address information which is converted based on the port number.

In accordance with another aspect of the disclosure, a satellite gateway for communicating with a ground gateway in a wireless communication system is provided. The satellite gateway includes a transceiver, and a processor configured to receive, from a first satellite including a session management function within a space core network (SCN) via the transceiver, an allocation request for a port number which is matched to identification information of a first general packet radio service (GPRS) tunneling protocol-user (GTP-U) tunnel to be used for transmission and reception of packets for a protocol data unit (PDU) session which is requested by a UE, allocate the port number which is matched to a first source internet protocol (IP) address which corresponds to the identification information of the first GTP-U tunnel, and manage a matching table including information in which the identification information of the first GTP-U tunnel is matched to the port number, wherein the first GTP-U tunnel is used in a path between a satellite base station which the UE accesses and the satellite gateway, and wherein the packets are transmitted or received to and from a terrestrial core network (TCN) by using address information which is converted based on the port number.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 16A and 16B are diagrams illustrating a case that a location update occurs due to mobility of a satellite in a wireless communication system using the satellite according to an embodiment of the disclosure;

FIGS. 18A and 18B are diagrams for describing mobility management based on an EA in a wireless communication system using a satellite according to an embodiment of the disclosure;

Throughout the drawings, like reference numerals will be understood to refer to like parts, components, and structures.

DETAILED DESCRIPTION

Figure 1:
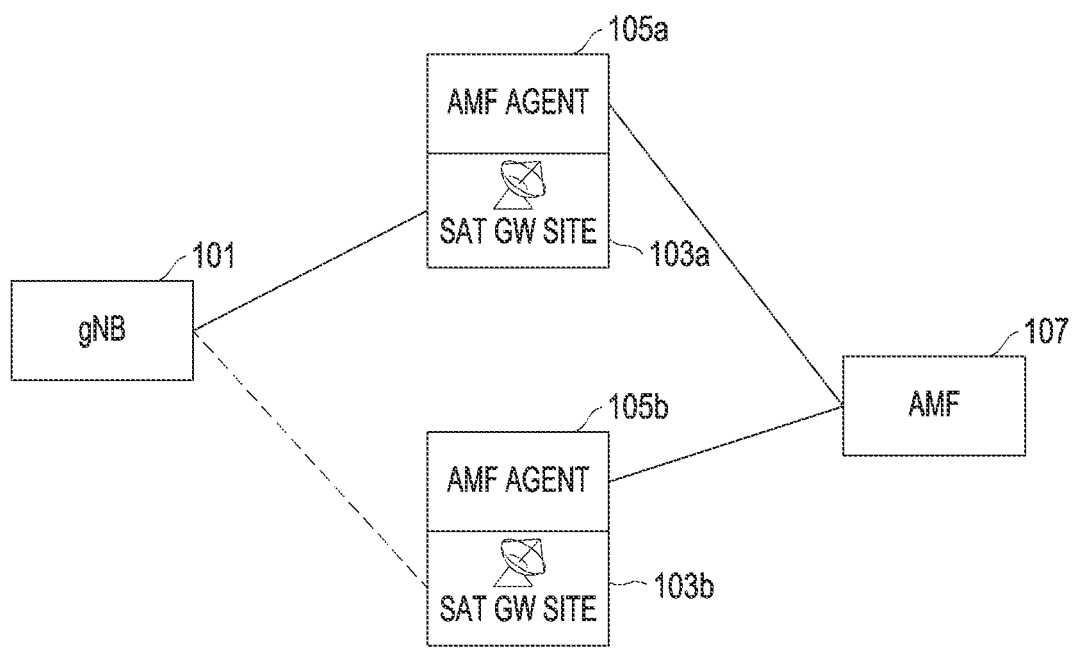
FIG. 1 is a diagram illustrating a communication system using a non-geostationary satellite systems (NGSO) scheme according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide operations for executing the functions described in connection with a block(s) in each flowchart.

Further, each block may represent a module, segment, or part of a code including one or more executable instructions for executing a specified logical function(s). Further, it should also be noted that in some replacement embodiments of the disclosure, the functions mentioned in the blocks may occur in different orders. For example, two blocks that are consecutively shown may be performed substantially simultaneously or in a reverse order depending on corresponding functions.

As used herein, the term "unit" used in an embodiment of the disclosure means a software element or a hardware element. A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a " . . . unit" may include one or more processors.

In the disclosure, a user equipment (UE) may include a terminal, a mobile station (MS), a cellular phone, a smart phone, a computer, or a multimedia system capable of performing a communication function. Further, embodiments of the disclosure may be applied to other communication systems having a technical background or channel format similar to an embodiment of the disclosure which will be described below. Further, embodiments of the disclosure may be modified in such a range as not to significantly depart from the scope of the disclosure under the determination by one of ordinary skill in the art and such modifications may be applicable to other communication systems.

Hereinafter, a term for identifying an access node/network entity, a term referring to a network entity or network functions (NFs), a term referring to messages, a term referring to interfaces between network objects, a term referring to various identification information, or the like, which are used in a description of the disclosure are exemplified for convenience of description. Accordingly, the disclosure is not limited to terms to be described below, and other terms referring to objects having equivalent technical meanings may be used.

In describing embodiments of the disclosure, a communication system to which the disclosure is applied may use various wired or wireless communication systems, for example, a next-generation communication system capable of communicating with a satellite, such as a fifth generation (5G) system or a sixth (6G) communication system proposed by third generation partnership project (3GPP) as a wireless communication standard standardization organization, or the like. Further, embodiments of the disclosure may be modified in such a range as not to significantly depart from the scope of the disclosure under the determination by one of ordinary skill in the art and such modifications may be applicable to other communication systems having a similar technical background.

In the following description, a term referring to a network entity(s), a term referring to messages, a term referring to information transmitted and received between network entities, and/or the like are exemplified for convenience of description. Therefore, the disclosure is not limited to terms used in the disclosure, and other terms referring to objects having equivalent technical meanings may be used.

An existing network configuration scheme of extending a coverage of a mobile network by installing a number of base stations on a ground in a communication system is inefficient in terms of facility investment or operating cost to cover all areas on the ground for service provision, and has a geographical limitation to extend a coverage to include sea and airspace. In Release 17 of 3GPP, a satellite has been considered as a new radio access technology (RAT) with an advantage of extending a coverage of an area where a service is not provided and enhancing reliability in a natural disaster situation. Recently, a plurality of projects which are based on a satellite communication, such as Starlink, OneWeb, or O3b Medium Earth Orbit (MEO) under research at SpaceX Inc. in the United States of America build a satellite constellation environment to provide an internet service anywhere in the world, so it is expected that emergence of a satellite access network (SAN) using a satellite as a RAT will be accelerated.

In this regard, various control procedures (for example, refer to a $3^{rd}$ generation partnership project (3GPP) standard TS23.501, TS23.502, TS23.503, and/or the like for a related control procedure in a 5G system) such as, for example, a registration procedure, a protocol data unit (PDU) session establishment procedure, a network triggered service request procedure, and/or the like performed in a control plane which are defined by 3GPP, a communication standard organization, are designed based on a communication on a ground without consideration of relatively a long propagation delay between the ground and a satellite. Therefore, if the satellite is used only as an access point in a network, a long propagation delay may occur.

The control procedures defined in the 3GPP standard are performed sequentially, packet delivery in a user plane starts after all related control procedures in the control plane are completed, so, if a long propagation delay in the control procedures occurs, a delay experienced by a user receiving a communication service in the satellite constellation environment may be further increased, which may eventually become one of causes of reducing a quality of service (QoS).

For better understanding of the disclosure, an existing communication technology using a satellite will be described.

An example of a communication scheme using a satellite includes a scheme (e.g., an NGSO scheme described in "5GS enhancement to Support gNBs on non-geostationary satellite systems (NGSO) Satellites" proposed in 3GPP Technical Report (TR) 23.737, Study on architecture aspects for using satellite access in 5G, V17.1.0, July 2020. The NGSO scheme proposes a scheme of reducing a delay and overhead of control traffic occurring between an access and mobility management function (AMF) in a terrestrial core network (CN) and the satellite.

FIG. 1 is a diagram illustrating a communication system using an NGSO scheme according to an embodiment of the disclosure.

Referring to FIG. 1, a gNB 101 is an on-board base station mounted on a satellite in an outer space. A SAT GW Site 103a or 103b represents a gateway which is located on a ground and connects a communication between the satellite and the ground, and an AMF agent 105a or 105b is some functions of an AMF 107 which are deployed in the SAT GW Site 103a or 103b. The AMF 107 is an NF which manages a wireless network access and mobility for a UE in a terrestrial CN. According to the structure in FIG. 1, the AMF agent 105a or 105b takes charge of the some functions (e.g., management between the UE and a radio access network (RAN), or the like) of the AMF 107, so it is possible to partially reduce overhead of control traffic which occurs between the AMF 107 on the ground and the satellite and to shorten a delivery path for the control traffic to partially reduce a delay which occurs in processing a control procedure in a control plane. However, the NGSO scheme considers only reduction in a communication between the terrestrial CN and the SAT GW Site 103a or 103b which generates a relatively short propagation delay, so the NGSO scheme may not reduce a communication in the control procedure between the terrestrial CN and the satellite which generates a relatively long propagation delay thereby effect of reducing the delay generated in the control procedure is small. In addition, there is a limit in that it may not reduce a bottleneck phenomenon which occurs in the SAT GW site 1003a or 103b where traffic is concentrated.

Referring to an IEEE paper (hereinafter, "Paper 1") by C. Liu et al., "Cell-Free Satellite-UAV Networks for 6G Wide-Area Internet of Things," IEEE Journal on Selected Areas in Communications (JSAC), to appear, it deals with an issue which occurs in extending a coverage of a network via a geostationary orbit (GEO) satellite. Paper 1 proposes a channel allocation scheme which improves network efficiency between the GEO satellite and a unmanned aerial vehicle (UAV)-swarm which is a cluster of UAVs while assuming a communication environment in which a coverage is extended via the UAV-swarm for an area outside the coverage of a terrestrial network. According to this scheme, there is an effect of addressing an issue of frequency interference which may occur in applying the GEO satellite to a mobile network. However, the scheme proposed in Paper 1 uses the satellite only as an access point of the mobile network, so a long delay occurs in a control procedure performed in a network, which causes QoS reduction, and there is a limitation in that control traffic increases in a CN.

Referring to an IEEE paper (hereinafter, referred to as "Paper 2") of J. Du et al., "Auction Design and Analysis for SDN-Based Traffic Offloading in Hybrid Satellite-Terrestrial Networks," *IEEE Journal on Selected Areas in Communications (JSAC)*, vol. 36, no. 10, pp. 2202-2217, October 2018, Paper 2 proposes a scheme in which a satellite network offloads traffic from a terrestrial network to process a high data rate and large-capacity traffic. This scheme provides auction-based optimal spectrum sharing for a frequency interference problem which occurs between a terrestrial base station and a satellite base station. In the scheme proposed in Paper 2, a satellite is used only as an access point of a mobile network, so a long delay occurs in a control procedure of a network. So, the scheme proposed in Paper 2 also has a limitation in that it may not provide a low-delay service to a UE.

Referring to Korean Patent Publication No. 10-2020-0067091 (published date: Jun. 11, 2020), "Method for receiving satellite information and supporting handover in a non-terrestrial network," the patent publication relates to a scheme of performing a handover between satellite base stations, and proposes a scheme of providing, to a UE before the handover, issues, such as service interruption time which may occur during the handover between the satellite base stations. According to Korean Patent Publication No. 10-2020-0067091, a system parameter is modified, so the UE which receives information about the service interruption time during the handover between the satellite base stations does not determine the service interruption time as a service failure, thereby preventing the service failure. Therefore, it is possible to prevent the UE from performing a re-attachment procedure which causes a long delay due to the service failure. However, the scheme proposed in Korean Patent Publication No. 10-2020-0067091 also has a limitation in that a long delay occurs in a control procedure of a network because a satellite is used only as an access point of a mobile network.

As described above, in existing communication technologies using a satellite, the satellite is used only as an access point of a mobile network, so there is common limitation in that a relatively long delay occurs in a control procedure(s) of a network, and traffic overhead increases in the control procedure(s).

Accordingly, embodiments of the disclosure propose a scheme in which a satellite may be used as an access point and the satellite performs some or all functions of a CN when at least one control procedure is performed.

Specifically, embodiments of the disclosure propose a communication scheme in which a space core network (SCN) is configured by deploying a network function (SNF)(s) at least one satellite in a satellite constellation environment to correspond to an NF and a CN defined in a 3GPP standard, and the SNF(s) in the SCN processes part or all of at least one control procedure which may be performed in the CN.

Embodiments of the disclosure may also be applied to a communication environment in which a UE may communicate directly with a satellite without going through a ground gateway (GROUND-GW) in the satellite constellation environment including a plurality of satellites. In embodiments of the disclosure, a satellite may be a computing node having a computing resource (e.g., a central processing unit (CPU), a random access memory (RAM), and a storage), and may communicate via a wireless link between satellites (e.g., an inter-satellite link)

According to embodiments of the disclosure, a communication delay between a satellite and a ground may be reduced, and amount of control traffic between the satellite and the ground may be reduced. In the satellite constellation environment, the SNF(s) may be implemented to have a function which corresponds to a related NF(s) in a CN structure defined in, for example, a 3GPP standard, TS23.501. The NF(s) may be a network entity (or an instance), such as an AMF for managing a wireless network access and mobility, a session management function (SMF) for managing a session for a UE, a policy control function (PCF) for managing an operator policy for providing the UE with a service in a wireless communication system, and/or the like. The instance may mean a state in which the NF exists in the form of a software code, a physical and/or logical resource is allocated to the NF from a computing system (e.g., a specific computing system existing in a CN) for the physical computing system to perform a function of a corresponding NF, and the physical computing system may execute the function of the corresponding NF.

Figure 2:
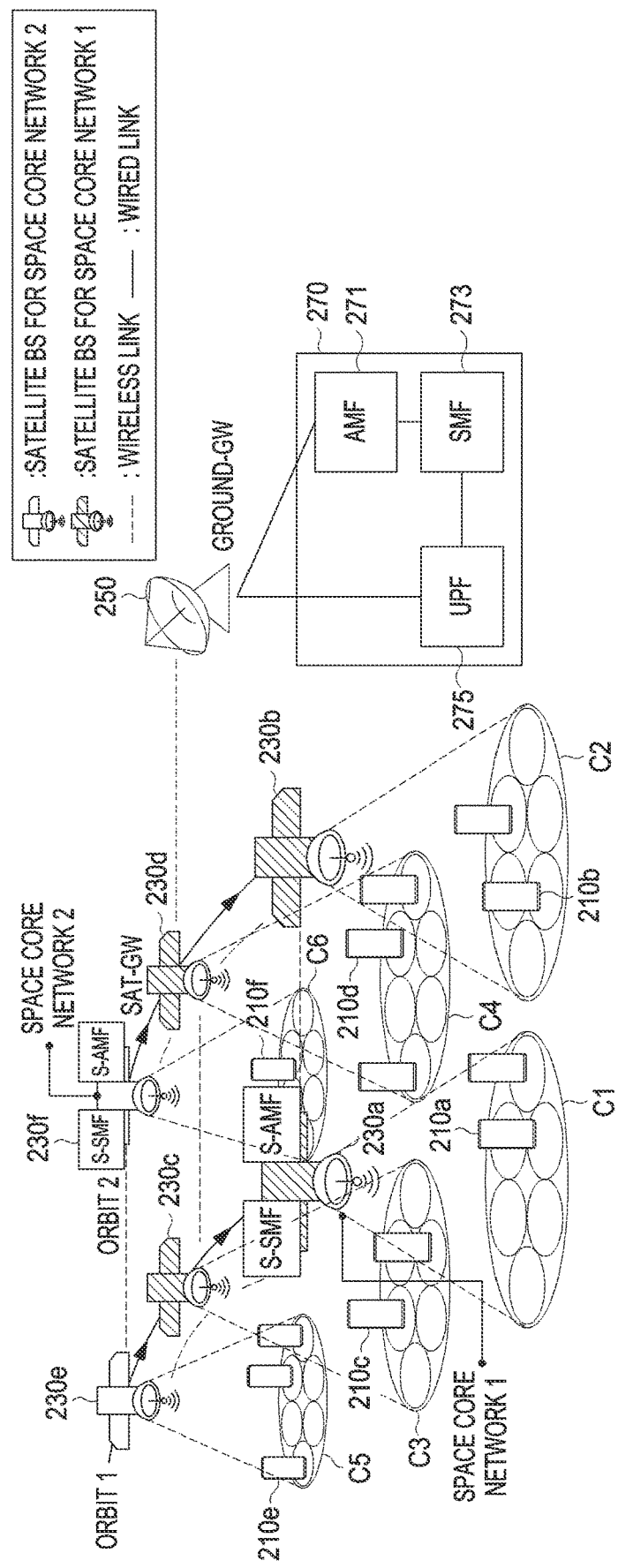
FIG. 2 is a diagram illustrating a structure of a wireless communication system using a satellite according to an embodiment of the disclosure.

FIG. 2 is a diagram illustrating a structure of a wireless communication system using a satellite according to an embodiment of the disclosure.

Referring to FIG. 2, in a satellite constellation environment, an access service via a wireless link is provided to each of a plurality of UEs 210a, 210b, . . . , 210f which are located at beam coverage C1, C2, . . . , C6 of a plurality of satellites 230a, 230b, . . . , 230f. To this end, the plurality of satellites 230a, 230b, . . . , 230f may include a base station function for a wireless access of a UE. The satellites 230a, 230c, and 230e may move along a first orbit ORBIT1 or may be fixed to an orbit which is a geostationary orbit, and the satellites 230b, 230d, and 230f may move along a second orbit ORBIT2 or may be fixed to an orbit which is a geostationary orbit.

An example in FIG. 2 represents an example in which first satellites 230a, 230b, 230c, and 230d among the plurality of satellites 230a, 230b, . . . , 230f belong to a first SCN (SCN1), and second satellites 230e and 230f among the plurality of satellites 230a, 230b, . . . , 230f belong to a second SCN (SCN2). At least one of the first satellites 230a, 230b, 230c, and 230d belonging to the SCN1 is an SNF(s) constituting the SCN1, and may include at least one of a satellite-SMF (S-SMF) and a satellite-AMF (S-AMF). FIG. 2 shows an example of a structure of the SCN1 in which the satellite 230a includes an S-SMF and an S-AMF. The S-SMF may be included in the satellite 230a and perform a function of managing (establishing, modifying, releasing, and/or the like) a session for a UE, and the S-AMF may be included in the satellite 230a and perform a function of managing a wireless network access and mobility of the UE. The first satellites 230a, 230b, 230c, and 230d belonging to the SCN1 may include a communication interface for a wireless communication between satellites. It is also possible to form a wireless backhaul link defined in a 3GPP standard among the first satellites 230a, 230b, 230c, and 230d. Likewise, at least one of the second satellites 230e and 230f belonging to the SCN2 may include at least one of an S-SMF and an S-AMF as an SNF(s) constituting the SCN2. FIG. 2 shows an example of a structure of the SCN2 in which the satellite 230f includes an S-SMF and an S-AMF.

In the example in FIG. 2, the satellite 230d in the SCN1 may perform a satellite gateway (SAT-GW) function for communicating with a GROUND-GW 250. The GROUND-GW 250 is connected to a terrestrial core network (TCN) 270, and the TCN 270 includes an AMF 271, an SMF 273, and a user plane function (UPF) 275 which processes data on a user plane. For convenience of description, a satellite core network will be referred to as an SCN and a terrestrial core network will be referred to as a TCN. In the example in FIG. 2, the SNF(s) or the NF(s) included in the SCN1, the SCN2, and the TCN 270 is just an example, and some or all of various NFs defined in a 3GPP standard may be implemented in the SCN1, the SCN2, and the TCN 270. In FIG. 2, traffic processed on a control plane and a user plane between the SCN1/SCN2 and the TCN 270 is transmitted/received via the SAT-GW and the GROUND-GW 250.

In the example in FIG. 2, if the UE is moved/moves out of a coverage range of an SCN which the UE accesses to a coverage of a new SCN due to mobility of a satellite or mobility of the UE (for example, if the UE is moved/moves from a coverage of the SCN2 to a coverage of the SCN1), a continuous mobile network service may be provided to the UE via service migration between the SCN1 and the SCN2. The TCN 270 and the SCNs (e.g., the SCN1 and the SCN2) in the satellite constellation environment are connected via a wireless link between an SAT-GW of the satellite 230d and the GROUND-GW 250. According to this, an SNF(s) in the SCN1 or the SCN2 and an NF(S) in the TCN 270 in FIG. 2 may be synchronized. The GROUND-GW 250 exists at a fixed location on the ground, so the satellite 230d physically closest to the GROUND-GW 250 may be selected as an SAT-GW to form a wireless link between the ground and a satellite network. For example, at least one of the plurality of satellites 230a, 230b, . . . , 230f may operate as an SAT-GW communicating with the GROUND-GW 250.

Figure 3:
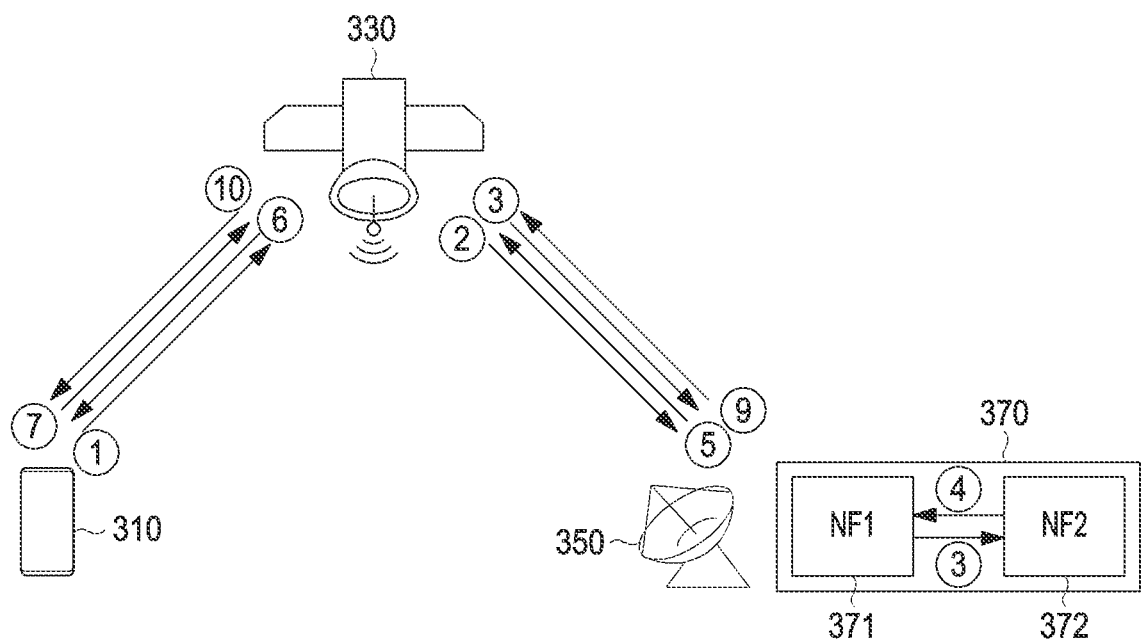
FIG. 3 is a diagram for describing a delay occurring between a satellite and a ground in a wireless communication system using a satellite according to an embodiment of the disclosure.

FIG. 3 is a diagram for describing delay occurring between a satellite and a ground in a wireless communication system using a satellite according to an embodiment of the disclosure.

Referring to FIG. 3, reference numerals ① to ⑩ illustrate a signaling process for performing an arbitrary control procedure. Assuming that four transmissions and receptions (①, ⑥, ⑦, and ⑩) are required between a UE 310 and a satellite 330 in the control procedure, a TCN 370 including related NFs (e.g., an NF1 371 and an NF2 372) participates in the control procedure, so a communication between a GROUND-GW 350 and the TCN 370 is required as well as a communication between the satellite 330 and the GROUND-GW 350. In this case, four transmissions and receptions (②, ③, ⑤, and ⑨) are also required between the satellite 330 and the GROUND-GW 350. Therefore, in a case of FIG. 3, a propagation delay of four round trip times (RTTs) which corresponds to total eight transmissions and receptions including the four transmissions and receptions between the UE 310 and the satellite 330 and the four transmissions and receptions between the satellite 330 and the GROUND-GW 350 occurs in a ground-satellite communication.

Figure 4:
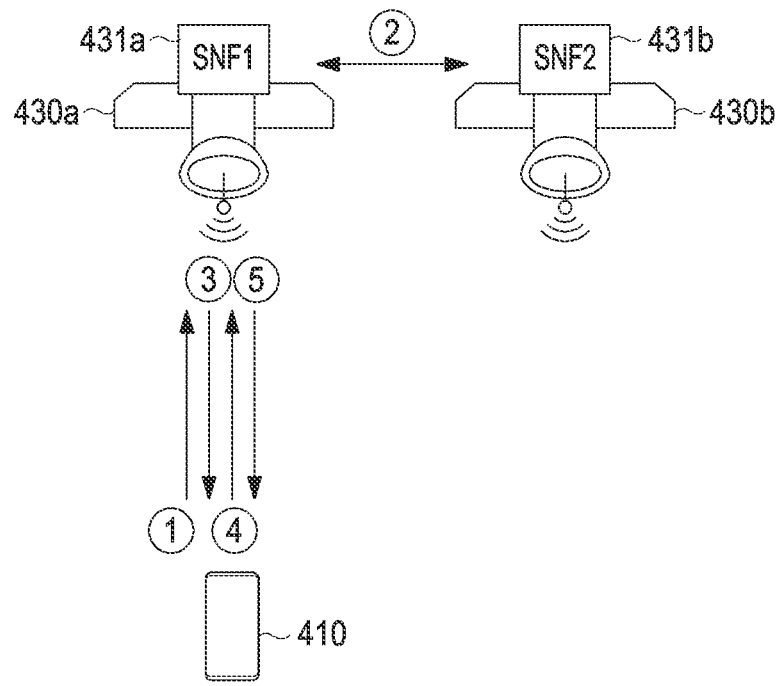
FIG. 4 is a diagram illustrating a structure of a wireless communication system for reducing a delay occurring between a satellite and a ground according to an embodiment of the disclosure.

FIG. 4 is a diagram illustrating a structure of a wireless communication system for reducing delay occurring between a satellite and a ground according to an embodiment of the disclosure.

Referring to FIG. 4, an example is illustrated in which SNFs (e.g., an SNF1 431a and an SNF2 431b constituting an SCN are included in satellites 430a and 430b according to the disclosure. Referring to FIG. 4, reference numerals ① to ⑤ exemplify a signaling process for performing a control procedure as shown in FIG. 3. Assuming that four transmissions and receptions (①, ③, ④, and ⑤) between a UE 410 and a satellite 430a are also required in a control procedure performed in the system in FIG. 4, in the control procedure, the SNF1 431a and the SNF2 431b are included in the SCN, not a TCN, so a communication between a GROUND-GW and the TCN as described in FIG. 3 may be omitted in a ground-satellite communication which causes a propagation delay. In a case of FIG. 4, a propagation delay of two RTTs which correspond to four transmissions and receptions between the UE 410 and the satellite 430a occurs in the ground-satellite communication. Like this, in the system in FIG. 4, the satellites 430a and 430b may provide a function of an SCN as well as a function of an access point for a wireless access, so a propagation delay occurring when a control procedure is performed may be reduced and signaling overhead may also be reduced compared to an example in FIG. 3.

Hereinafter, various operating methods of an SCN in a wireless communication system using a satellite according to an embodiment of the disclosure will be described with procedures a) to d) below as an example. An SCN proposed in the disclosure is not limited to the procedures a) to d) below, and the SCN in the disclosure may be applied in the same or similar manner in various control procedures to which the SCN may be applied.

a) PDU session establishment
b) Network triggered service request
c) Location update
d) Mobility management The procedures a) to d) proposed in the disclosure may be performed individually or at least two of the procedures a) to d) may be combined and performed. For example, assuming a situation in which the at least two of the procedures a) to d) are combined and performed, after a PDU session is established according to the procedure a), the procedure b) may be performed if downlink data is received via the established PDU session. In a state where the established PDU session is maintained (in a connected state of a UE), the procedure c) may be performed for a location update due to mobility of the UE or a satellite. In relation to the location update, mobility management may be prepared according to the procedure d).

PDU Session Establishment

Figure 5:
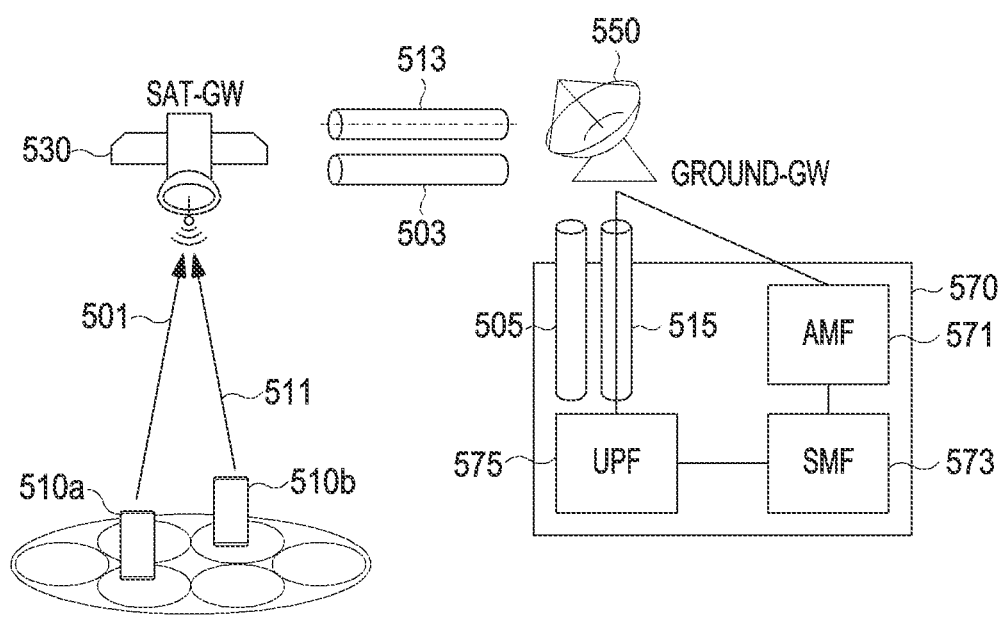
FIG. 5 is a diagram for describing a delay occurring between a satellite and a ground when a protocol data unit (PDU) session establishment procedure is performed in a wireless communication system using a satellite according to an embodiment of the disclosure.

FIG. 5 is a diagram for describing delay occurring between a satellite and a ground when a PDU session establishment procedure is performed in a wireless communication system using a satellite according to an embodiment of the disclosure.

Referring to FIG. 5, a satellite 530 may include a satellite base station function to provide UEs 510a and 510b with a wireless access service, and operate as an SAT-GW to perform a satellite-ground communication with a GROUND-GW 550. When performing a control procedure for the UEs 510a and 510b, the satellite 530 transmits and receives control and data traffic to and from a TCN 570 via the GROUND-GW 550. The TCN 270 includes an AMF 571, an SMF 573, an UPF 575, and/or the like as NFs, and a description of the NFs may refer to a 3GPP standard. In an existing PDU session establishment procedure defined in the 3GPP standard, a general packet radio service (GPRS) tunneling protocol-user (GTP-U) tunnel is generated per UE for packet transmission and reception of a UE. An example in FIG. 5 shows GTP-U tunnels 513 and 503 generated between the SAT-GW and the GROUND-GW 550 and a GTP-U tunnel 505 generated between the GROUND-GW 550 and the UPF 575 according to a request 501 of the UE 510*a*. Similarly, GTP-U tunnels 511 and 515 are generated according to a request 511 of the UE 510*b*.

In a scheme of managing a GTP-U tunnel per UE as the example in FIG. 5, inefficiency of generating/modifying/releasing a GTP-U tunnel per UE on a corresponding path according to a request of a UE occurs. In particular, for generating a GTP-U tunnel according to an existing PDU session establishment procedure, according to the applicant's experiment, a propagation delay of approximately five RTTs (e.g., 720 ms) between an SAT-GW and a GROUND-GW occurs except for an optional procedure, so there is a limit to using the existing PDU session establishment procedure as it is in a wireless communication system using a satellite.

Figure 6:
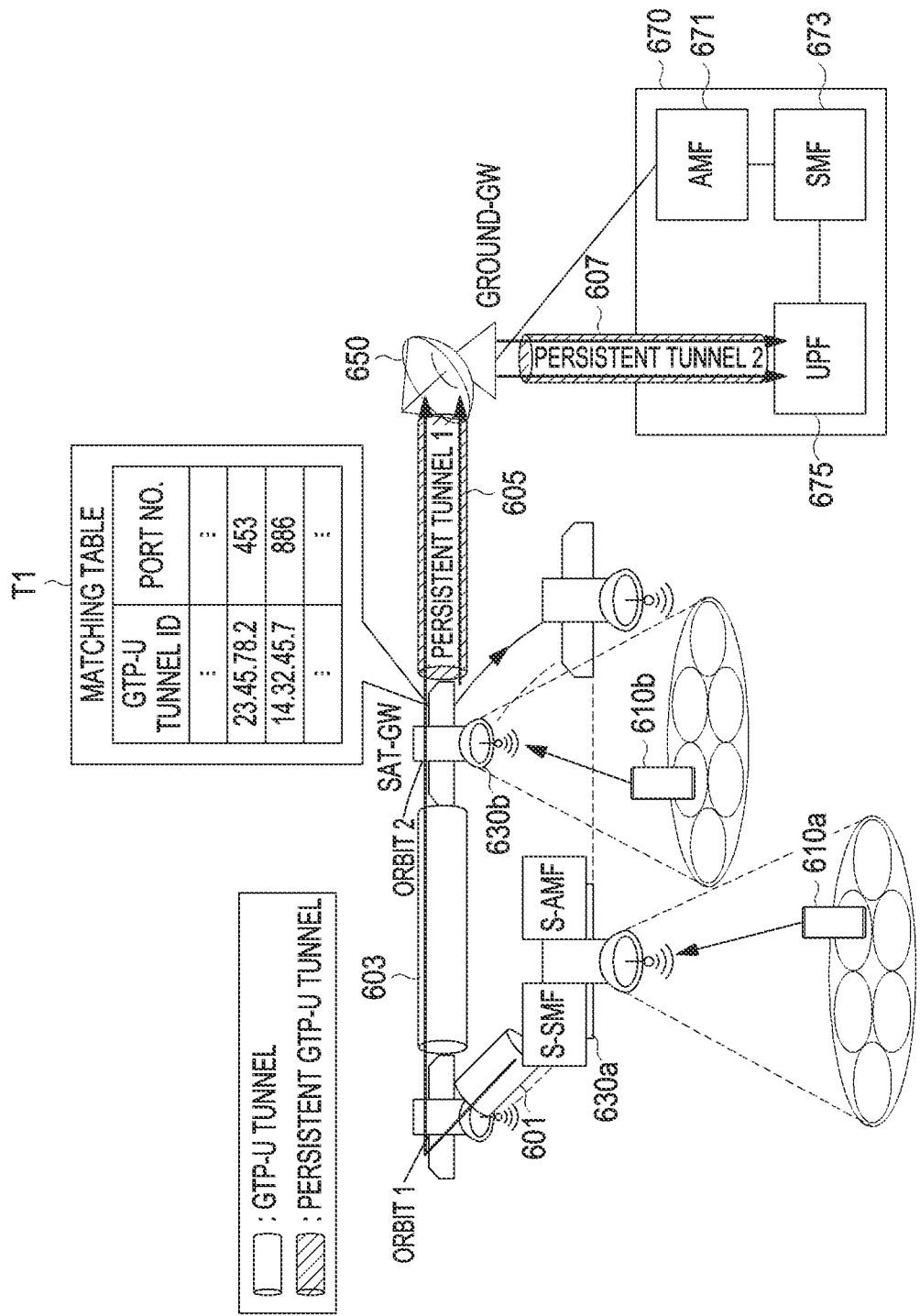
FIG. 6 is a diagram for describing a communication method using a persistent GTP-U tunnel in a wireless communication system using a satellite according to an embodiment of the disclosure.

FIG. 6 is a diagram for describing a communication method using a persistent GTP-U tunnel in a wireless communication system using a satellite according to an embodiment of the disclosure.

Referring to FIG. 6, as described in an embodiment in FIG. 2, a plurality of satellites 630*a*, 630*b*, . . . belong to an SCN, the satellite 630*a* includes an S-SMF and an S-AMF of the SCN, and the satellite 630*b* performs an SAT-GW role for communicating with a GROUND-GW 650. The GROUND-GW 650 is connected to a TCN 670, and the TCN 670 includes an AMF 671, an SMF 673, an UPF 675, and/or the like.

In an example in FIG. 6, GTP-U tunnels 601 and 603 which are generated/modified/released according to a request per UE (e.g., per UE) are used for a path between the satellite 630*a* and the satellite 630*b*, and persistent GTP-U tunnels 605 and 607 which are persistently (or semi-persistently) maintained to be shared by a plurality of UEs are used for a path among the satellite 630*b*, the GROUND-GW 650, and the UPF 675. According to the example in FIG. 6, for a path (i.e., a path between an SAT GW and a GROUND-GW and a path between the GROUND-GW and a terrestrial UPF shared between UEs, a GTP-U tunnel is not generated every time according to a request of a UE and the GTP-U tunnel is persistently maintained, so time required to establish a PDU session and overhead of control traffic generated when establishing the PDU session may be significantly reduced. In addition, for maintaining the persistent GTP-U tunnels 605 and 607, the satellite 630*b* operating as an SAT-GW in the disclosure manages a matching table including information in which a GTP-U tunnel identifier (ID) (which corresponds to a source internet protocol (IP) address) between the SAT-GW and the UE is matched to a port number.

Figure 7:
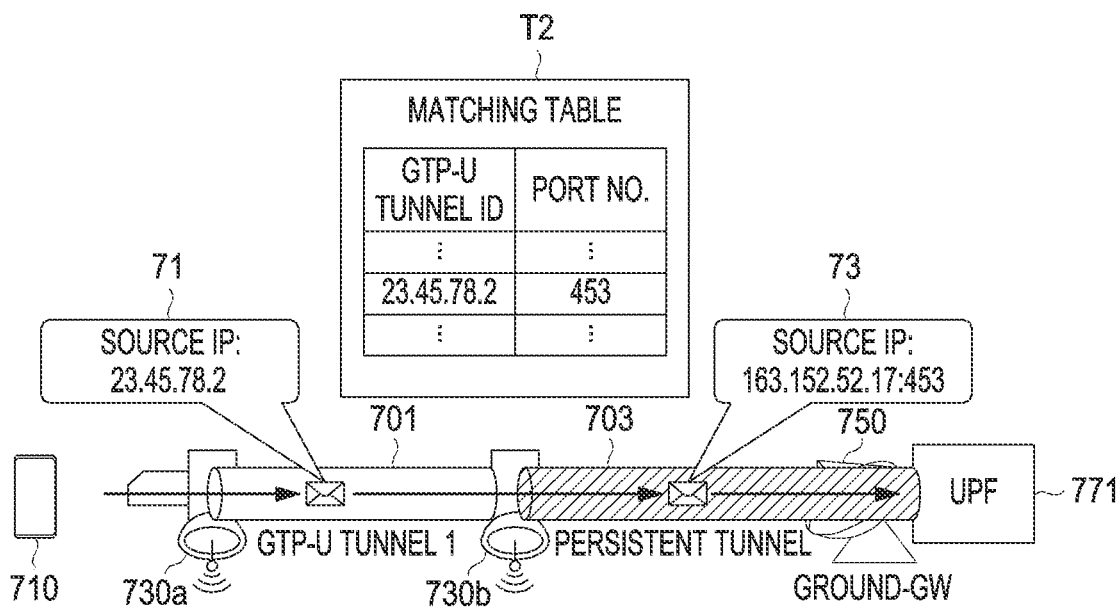
FIG. 7 is a diagram for describing a packet transmission method using a persistent GTP-U tunnel according to an embodiment of the disclosure.

FIG. 7 is a diagram for describing a packet transmission method using a persistent GTP-U tunnel according to an embodiment of the disclosure.

Referring to FIG. 7, it shows a process in which a packet transmitted from a UE 710 is delivered to an UPF 771 in a TCN via satellites 730*a* and 730*b* and a GROUND-GW 750 upon uplink transmission of the UE 710. Referring to FIG. 7, the satellite 730*a* operates as a satellite base station, and the satellite 730*b* operates as an SAT-GW. If the UE 710 transmits an uplink packet using a GPT-U tunnel 701, the satellite 730*b* operating as the SAT-GW identifies a port number 453 which is mapped to a GTP-U tunnel ID (e.g., 23.45.78.2, which is a first source IP address 71) based on a matching table T2 in which a GTP-U tunnel ID (corresponds to a first source IP address of the GPT-U tunnel 701) is mapped to a port number, and converts the first source IP address 71 into a second source IP address 73 including an IP address (e.g., 163.152.52.17) of the SAT-GW and the port number 453. The satellite 730*b* delivers, to the UPF 771, the uplink packet via the GROUND-GW 750 by using the persistent GTP-U tunnel 703 based on the second source IP address 73 (e.g., 163.152.52.17:453).

In the example in FIG. 7, the operation of delivering the uplink packet by using the persistent GTP-U tunnel 703 in an uplink has been described, however, an operation of delivering a downlink packet by using the persistent GTP-U tunnel 703 in a downlink may also be performed in a reverse process to that of FIG. 7. Upon receiving a downlink packet by using the persistent GTP-U tunnel 703 via the GROUND-GW 750, the satellite 730*b* identifies a port number (e.g., 453) based on the matching table T2 in which a GTP-U tunnel ID (i.e., the first source IP address 71) of the GTP-U tunnel 701 generated for the UE 710 is mapped to the port number, and converts the second source IP address 73 including the port number 453 into the first source IP address 71. The satellite 730*b* transmits a downlink packet to be delivered to the UE 710 by using the GPT-U tunnel 701 which corresponds to the GTP-U tunnel ID of the first source IP address 71. So, the satellite 730*b* operating as the SAT-GW may manage the persistent GTP-U tunnel so that a plurality of UEs may commonly use the persistent GTP-U tunnel.

Figure 8A:
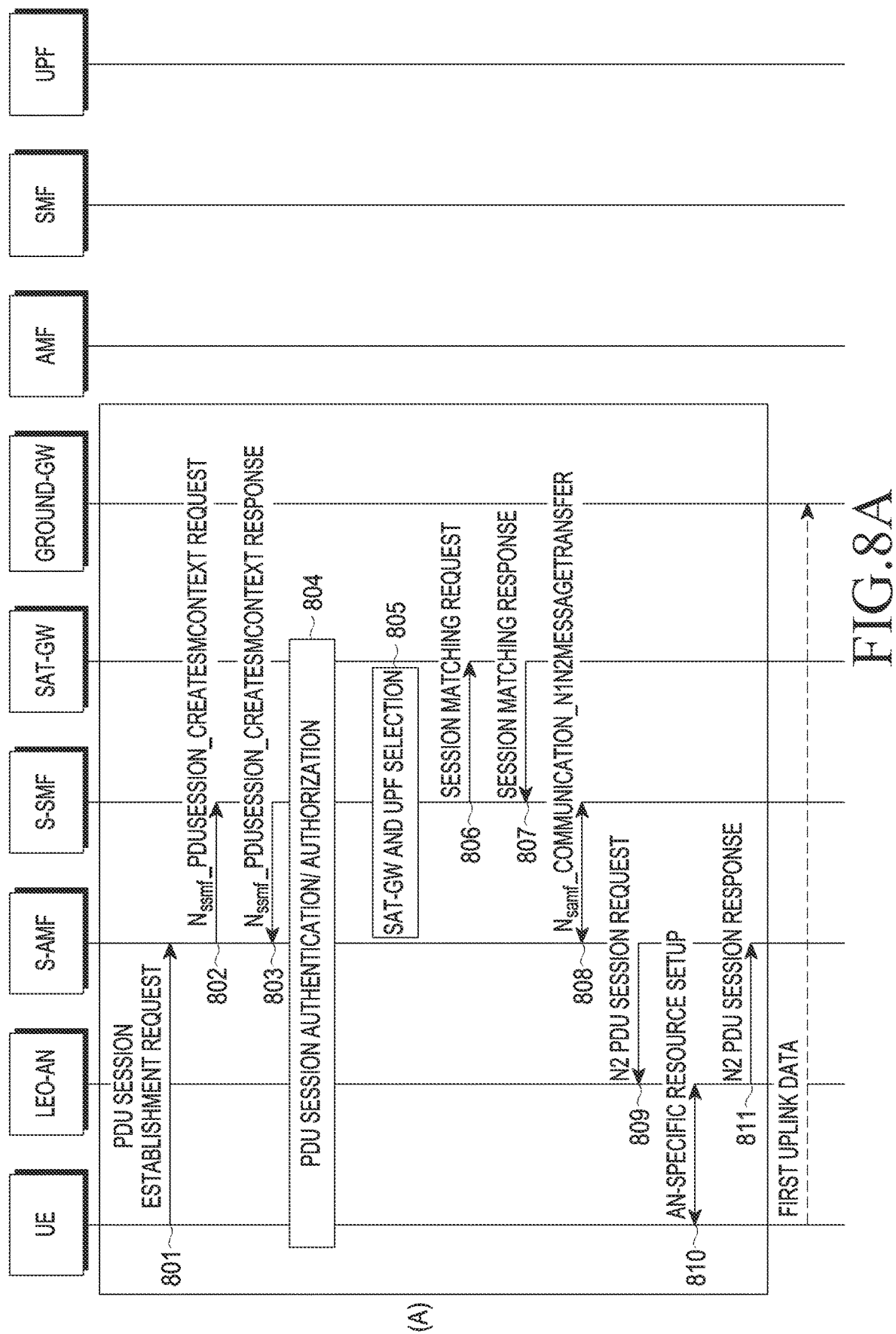
FIGS. 8A and 8B are flowcharts illustrating a PDU session establishment procedure among control procedures performed in a wireless communication system using a satellite according to various embodiments of the disclosure.
Figure 8B:
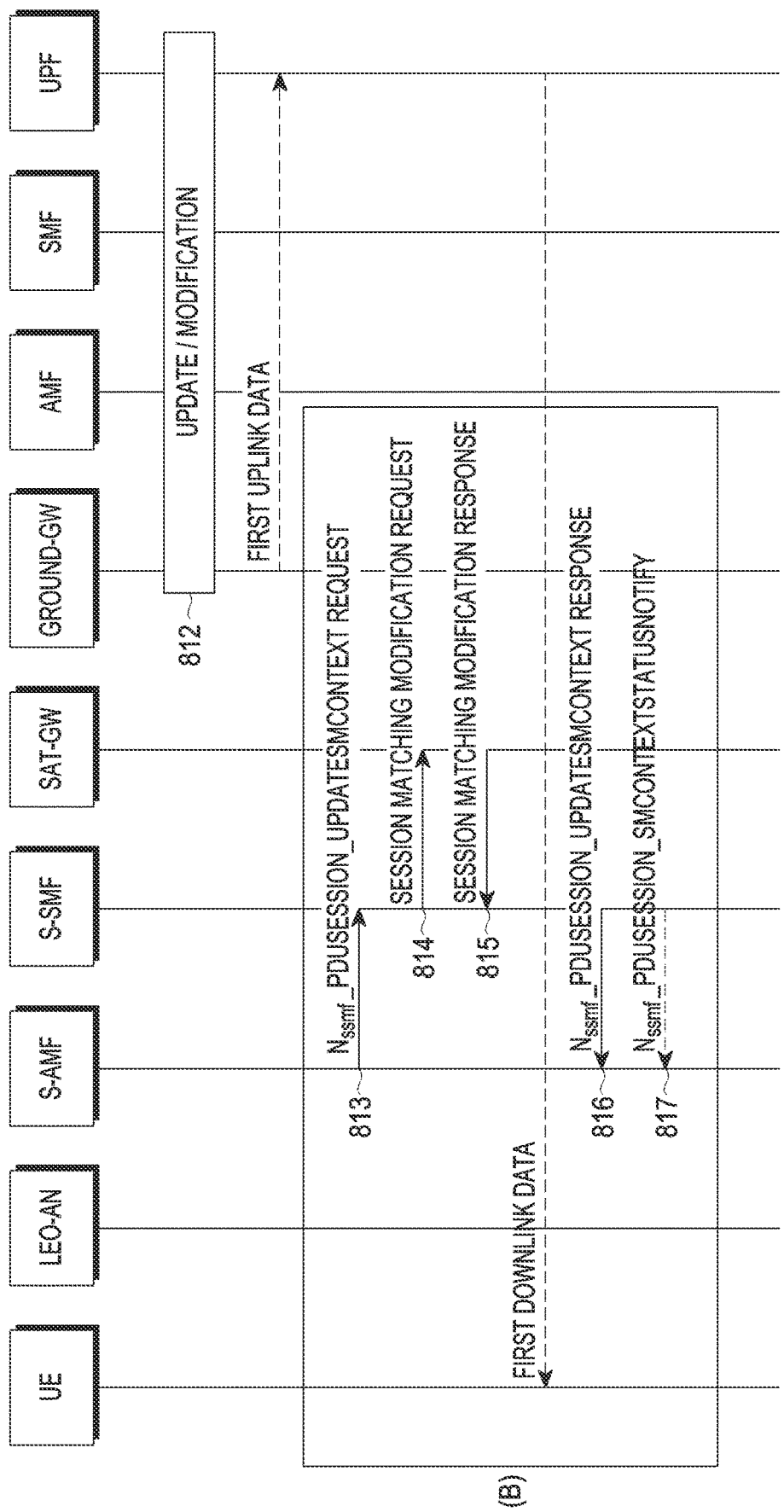

FIGS. 8A and 8B are flowcharts illustrating a PDU session establishment procedure among control procedures performed in a wireless communication system using a satellite according to various embodiments of the disclosure.

A low earth orbit (LEO)-access network (AN) in FIGS. 8A and 8B exemplifies, for example, a case that a satellite base station is mounted on a low orbit satellite. This shows only an example, and the satellite base station may be mounted on a geostationary satellite. An S-AMF and an S-SMF are SNFs constituting an SCN according to the disclosure, and the S-AMF and S-SMF may be included in the same satellite or may be included in different satellites within the SCN. A SAT-GW and a GROUND-GW correspond to the above-described satellite gateway and ground gateway. An AMF, an SMF, and an UPF are NFs constituting a TCN.

A procedure (A) in FIG. 8A shows a process of generating a GTP-U tunnel for a UE from a LEO-AN to an SAT-GW according to a PDU session establishment request of the UE. A procedure (B) in FIG. 8B shows a process of modifying a GTP-U tunnel when modification is required for the GTP-U tunnel within an SCN.

Referring to FIGS. 8A and 8B, a UE transmits a PDU session establishment request to an S-AMF of an SCN via an LEO-AN which the UE wirelessly accesses in operation 801, and the S-AMF transmits, to an S-SMF, an Nssmf_PDUSession_CreateSMContext request for generating association between the S-AMF and the S-SMF to support a PDU session for the UE in operation 802. In operation 803, the S-SMF processes the PDU session establishment request to generate an SM context, and transmits, to the S-AMF, an Nssmf_PDUSession_CreateSMContext response including an SM context ID of the generated SM context. In operation 804, authentication/authorization for the requested PDU session is performed.

In operation 805, the S-SMF identifies whether a separate GTP-U tunnel or an UPF, not a persistent GTP-U tunnel is required for the UE, and selects an SAT-GW and an UPF for a PDU session. If a separate delivery path is required for a requested PDU session, a separate GTP-U tunnel and an UPF are allocated (selected) for the PDU session via a communication between a GROUND-GW and a TCN in operation 812. So, if the separate delivery path is not required for the requested PDU session, operation 812 may be omitted. In operation 806, the S-SMF transmits, to the SAT-GW, a session matching request for requesting allocation of a port number which is matched to the GTP-U tunnel, and receives, from the SAT-GW, a session matching response as a response to the session matching request. The SAT-GW manages the above-described matching table in which the GTP-U tunnel ID (which corresponds to a source IP address) is mapped to the allocated port number.

In operation 808, Nsamf_Communication_N1N2MessageTransfer including a PDU session ID, session management (SM) information, an SM container including QoS-related information, and/or the like is delivered from the S-SMF to the S-AMF. In operation 809, an N2 PDU session request including a PDU session ID, an SM container, and/or the like is delivered from the S-AMF to the LEO-AN. In operation 810, if the PDU session establishment requested is accepted, AN-specific resource setup is performed so that radio resource control (RRC) connection reconfiguration is performed by setting up a radio access network (RAN) resource required in relation to a QoS rule between the LEO-AN and the UE and an NAS message including a PDU session ID, an SM container, and/or the like is delivered from the LEO-AN to the UE. In operation 811, a PDU session response is transmitted from the LEO-AN to the S-AMF in response to the PDU session request in operation 809. Thereafter, first uplink data transmitted from the UE by using the established PDU session may be delivered to the TCN via the LEO-AN, the SAT-GW, and the GROUN-GW. First downlink data transmitted from the TCN may be delivered to the UE via the GROUN-GW, the SAT-GW, and the LEO-AN.

Describing an operation of the disclosure for modifying a GTP-U tunnel with reference to a procedure (B) in FIG. 8B, if modification is required for a GTP-U tunnel within an SCN, in operation 813, the S-AMF transmits, to the S-SMF, an Nssmf_PDUSession_UpdateSMContext request including a related SM context ID, SM information, request type, and/or the like. In operation 814, the S-SMF transmits, to the SAT-GW, a session matching modification request based on a modified GTP-U tunnel ID (e.g., a modified source IP address). In operation 815, the SAT-GW allocates a port number matched according to the modified GTP-U tunnel ID (e.g., the modified source IP address), updates matching information thereof in a matching table, and transmits, to the S-SMF, a session matching modification response according to the session matching modification. Thereafter, in operations 816 and 817, the S-SMF transmits, to the S-AMF, an Nssmf_PDUSession_UpdateSMContext response to the session matching modification request, and notifies an updated SM context status.

Network Triggered Service Request

Figure 9:
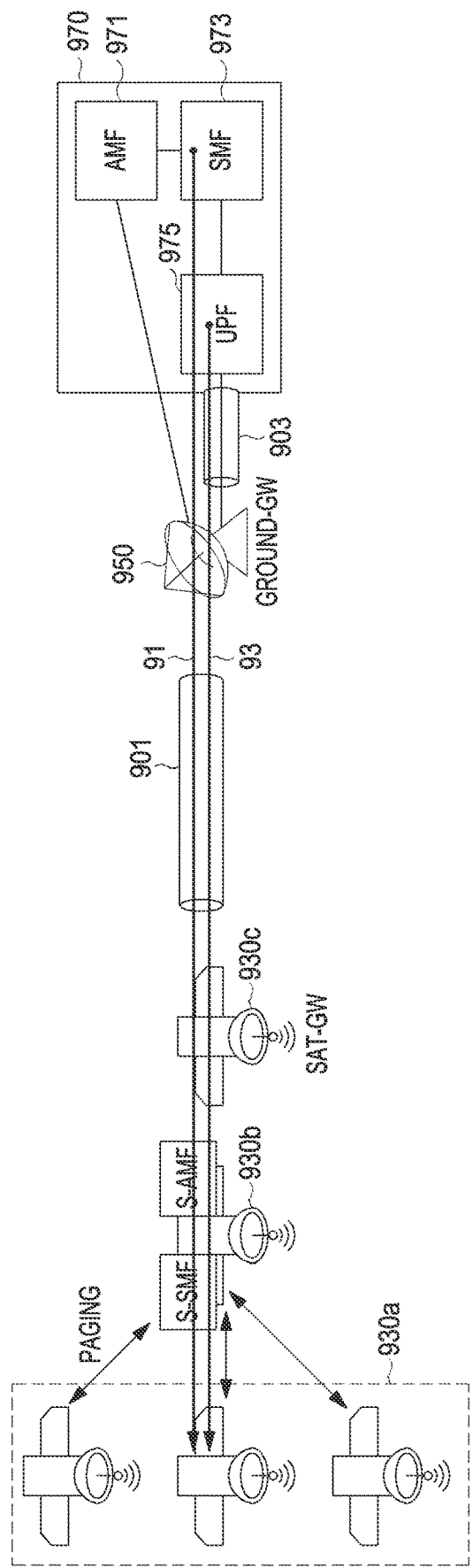
FIG. 9 is a diagram for describing control traffic overhead and a delay occurring between a satellite and a ground when an existing network triggered service request procedure is performed in a wireless communication system using a satellite according to an embodiment of the disclosure.

FIG. 9 is a diagram for describing control traffic overhead and delay occurring between a satellite and a ground when an existing network triggered service request procedure is performed in a wireless communication system using a satellite according to an embodiment of the disclosure.

Referring to FIG. 9 shows control traffic overhead and a delay occurring between a satellite and a ground in a case that an existing network trigged service request is applied to a satellite network environment (i.e., an SCN) according to the disclosure as it is. Among a plurality of satellites 930a, 930b, and 930c, the satellites 930a receives, from an S-AMF, a paging message, and transmit, to a UE(s), the paging message, the satellite 930b includes an S-SMF and the S-AMF constituting an SCN, and the satellite 930c performs a SAT-GW function for communicating with a GROUND-GW 950. The GROUND-GW 950 is connected to a TCN 970, and the TCN 970 includes an AMF 971, an SMF 973, and an UPF 975, a GTP-U tunnel 901 is formed between an SAT-GW and the GROUND-GW 950, and a GTP-U tunnel 903 is formed between the GROUND-GW 950 and the UPF 975. In the example in FIG. 9, similar to an existing network triggered service request, a control procedure triggered from the TCN 970 is designed such that a control message and data traffic are sequentially transmitted. Due to this, in a path between a ground and a satellite, a data notification message for a network trigged service request is first transmitted from the SMF 973 to the UE (91), and downlink data is sequentially transmitted after paging for the UE (93), so inefficiency of increasing the number of times of communication between the SAT-GW and the GROUND-GW 950 occurs.

Figure 10:
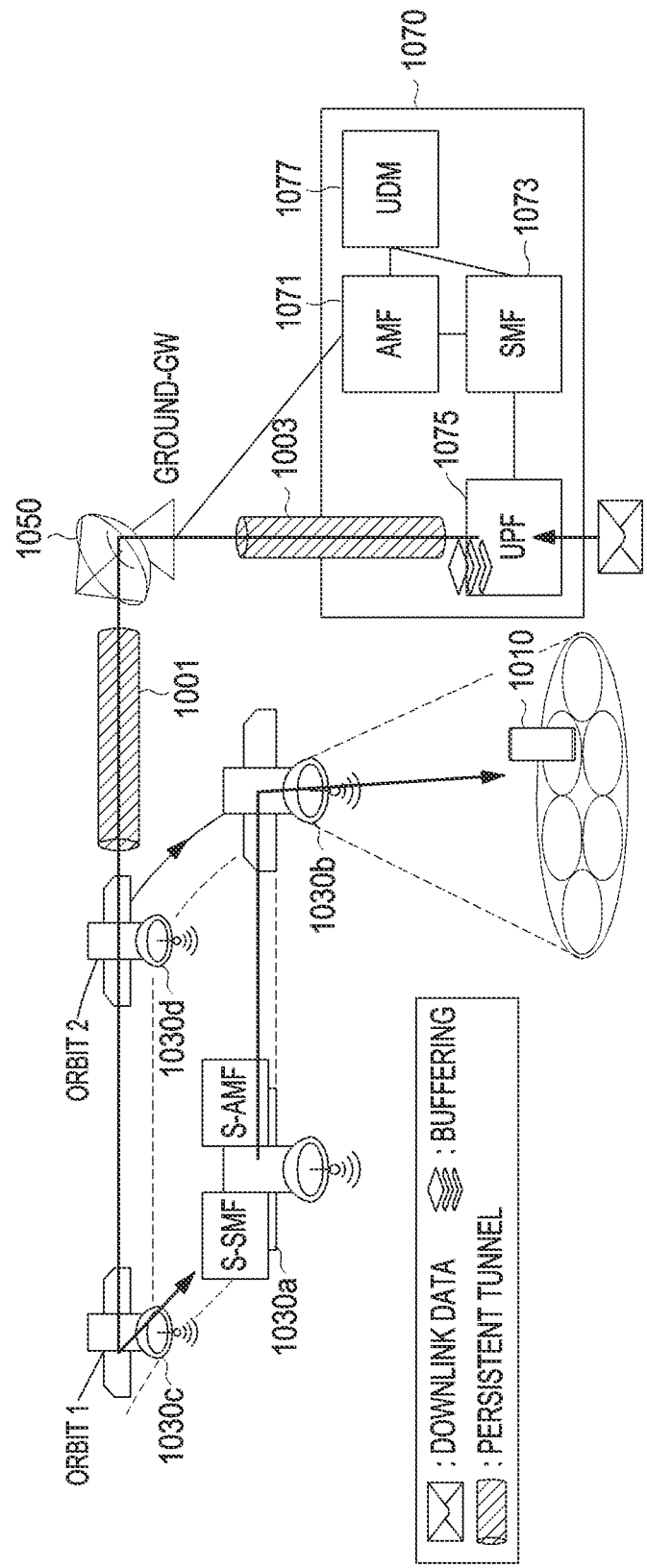
FIG. 10 is a diagram illustrating a wireless communication system using a satellite to which a network trigged service request procedure is applied according to an embodiment of the disclosure.

FIG. 10 is a diagram illustrating a wireless communication system using a satellite to which a network trigged service request procedure is applied according to an embodiment of the disclosure.

Referring to FIG. 10, as described in an example in FIG. 6, a plurality of satellites 1030a, 1030b, 1030c, and 1030d belong to an SCN, the satellite 1030a includes a satellite base station function to provide a UE 1010 with a wireless access service, and the satellite 1030a includes an S-SMF and an S-AMF of the SCN, and the satellite 1030d operates as an SAT-GW for communicating with a GROUND-GW 1050. The GROUND-GW 1050 is connected to a TCN 1070, and the TCN 1070 manages an AMF 1071, an SMF 1073, an UPF 1075, and subscription information of a UE, and includes a unified data management (UDM) 1077 for performing subscriber identification processing, registration management for a serving (S-)AMF and the serving (S-) AMF of the UE, and/or the like. In the example in FIG. 10, in a path among the satellite 1030d, the GROUND-GW 1050, and the UPF 1075, persistent GTP-U tunnels 1001 and 1003 which are persistently (or semi-persistently) maintained to be shared by a plurality of UEs are used. In the example in FIG. 10, if downlink data to be transmitted to the UE 1010 is delivered to the UPF 1075, the UPF 1075 buffers the downlink data in an internal buffer, identifies a location of the UE 1010 via the AMF 1071, the SMF 1073, and the UDM 1077 of the TCN 1070, and transmits, to the UE 1010, the downlink data via the satellites 1030a, 1030b, 1030c, and 1030d which serve the UE 1010.

Figure 11:
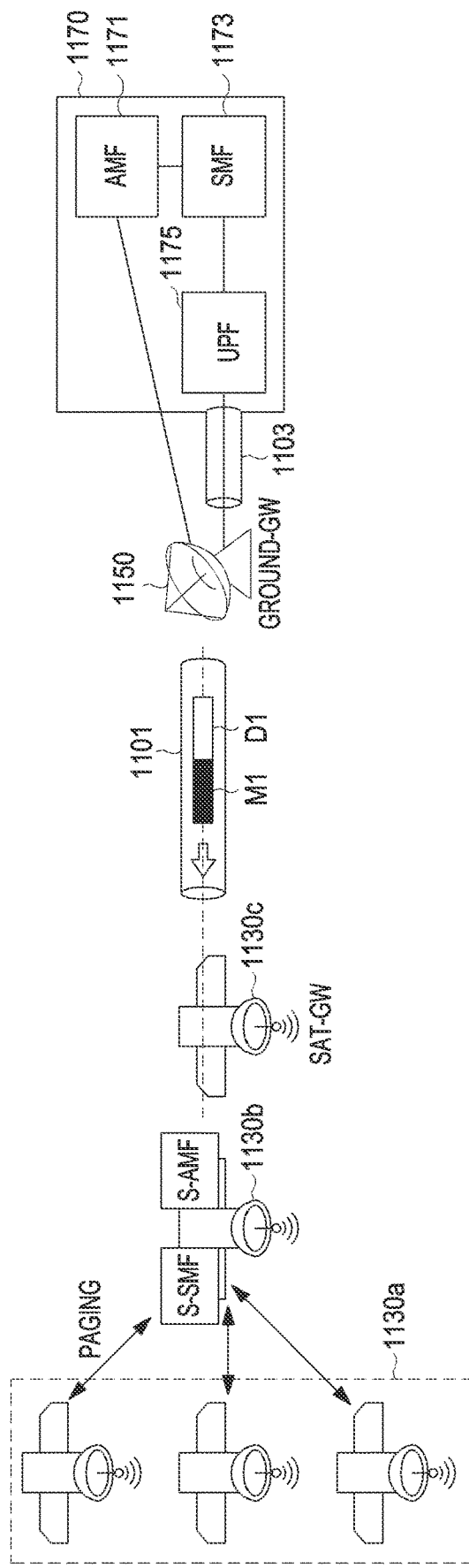
FIG. 11 is a diagram for describing a scheme of piggybacking downlink data to a data notification message and transmitting the data notification message in a wireless communication system using a satellite to which a network trigged service request procedure is applied according to an embodiment of the disclosure.

FIG. 11 is a diagram for describing a scheme of piggybacking downlink data to a data notification message and transmitting the data notification message in a wireless communication system using a satellite to which a network trigged service request procedure is applied according to an embodiment of the disclosure.

In a case that information about a satellite serving a UE may not be identified and information about an SCN may be identified in an example in FIG. 10, downlink data may be efficiently transmitted to the UE by using a scheme in FIG. 11 according to the disclosure.

Referring to FIG. 11, among a plurality of satellites 1130a, 1130b, and 1130c, satellites 1130a receive a paging message from an S-AMF to transmit the paging message to a UE(s), the satellite 1130b includes an S-SMF and an S-AMF which constitute an SCN, and the satellite 1130c performs an SAT-GW function for communicating with a GROUND-GW 1150. The GROUND-GW 1150 is connected to a TCN 1170, the TCN 1170 includes an AMF 1171, an SMF 1173, and an UPF 1175, and persistent GTP-U tunnels 1101 and 1103 which are maintained persistently (or semi-persistently) to be shared by a plurality of UEs may be used in a path among a satellite 1030d which operates as an SAT-GW in an example in FIG. 11, a GROUND-GW 1150, and an UPF 1075.

In the example in FIG. 11, the SMF 1173 of the TCN 1170 piggybacks first downlink data D1 to be transmitted to the UE in a data notification message M1 to be transmitted to the UE, and delivers the data notification message M1 to an S-SMF to which the UE belongs via a control plane. The satellite 1130b in which the S-SMF is deployed buffers the received first downlink data M1 in an internal buffer, and identifies the satellite 1130a serving the UE via paging. Thereafter, the satellite 1130b in which the S-SMF is deployed forms a link on a user plane to the UE, and delivers the buffered first downlink data M1 to the UE via the user plane. If the downlink data M1 to be transmitted first is piggybacked in the data notification message M1 and the data notification message M1 is delivered as in the scheme in FIG. 11, communication overhead between a ground and a satellite may be reduced, and more fast data transmission to the UE may be possible.

Figure 12A:
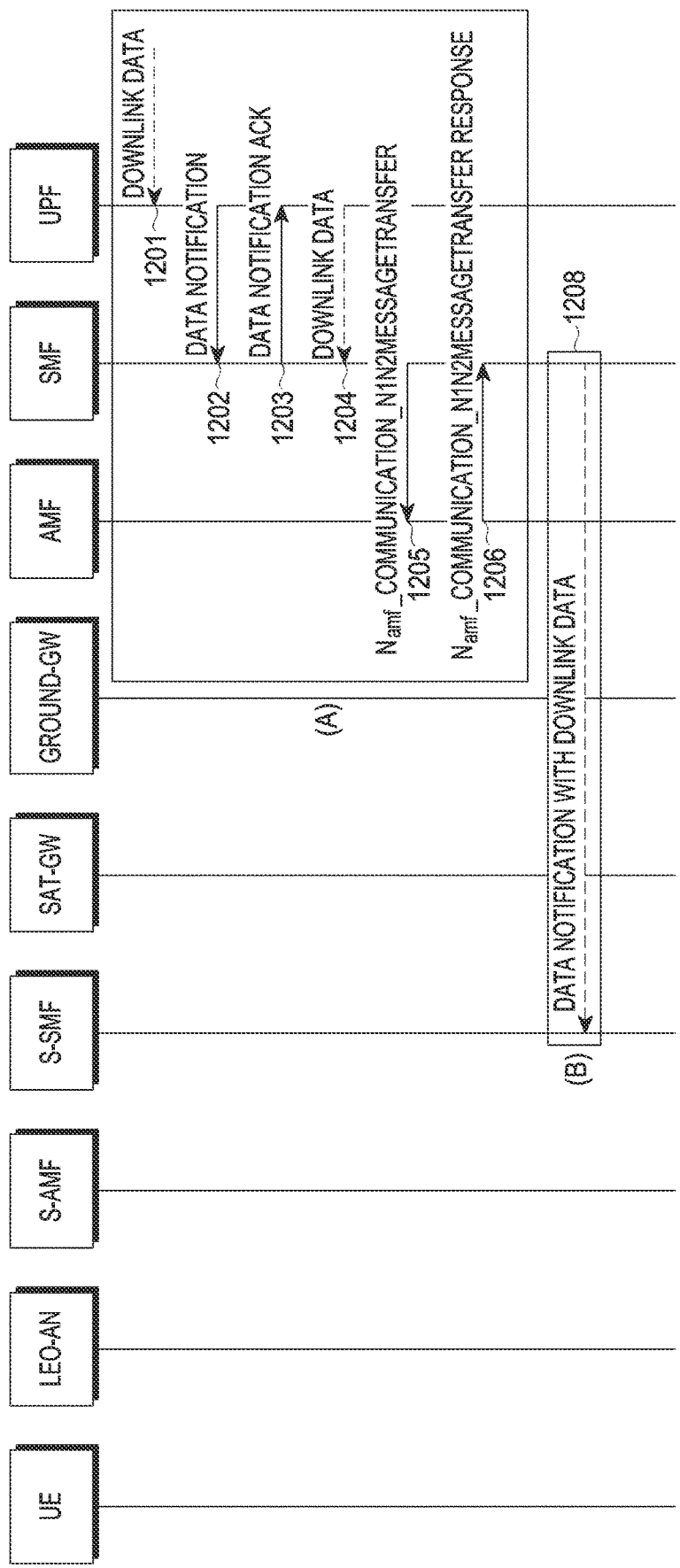
FIGS. 12A and 12B are flowcharts illustrating a network trigged service request procedure in a wireless communication system using a satellite according to various embodiments of the disclosure.
Figure 12B:
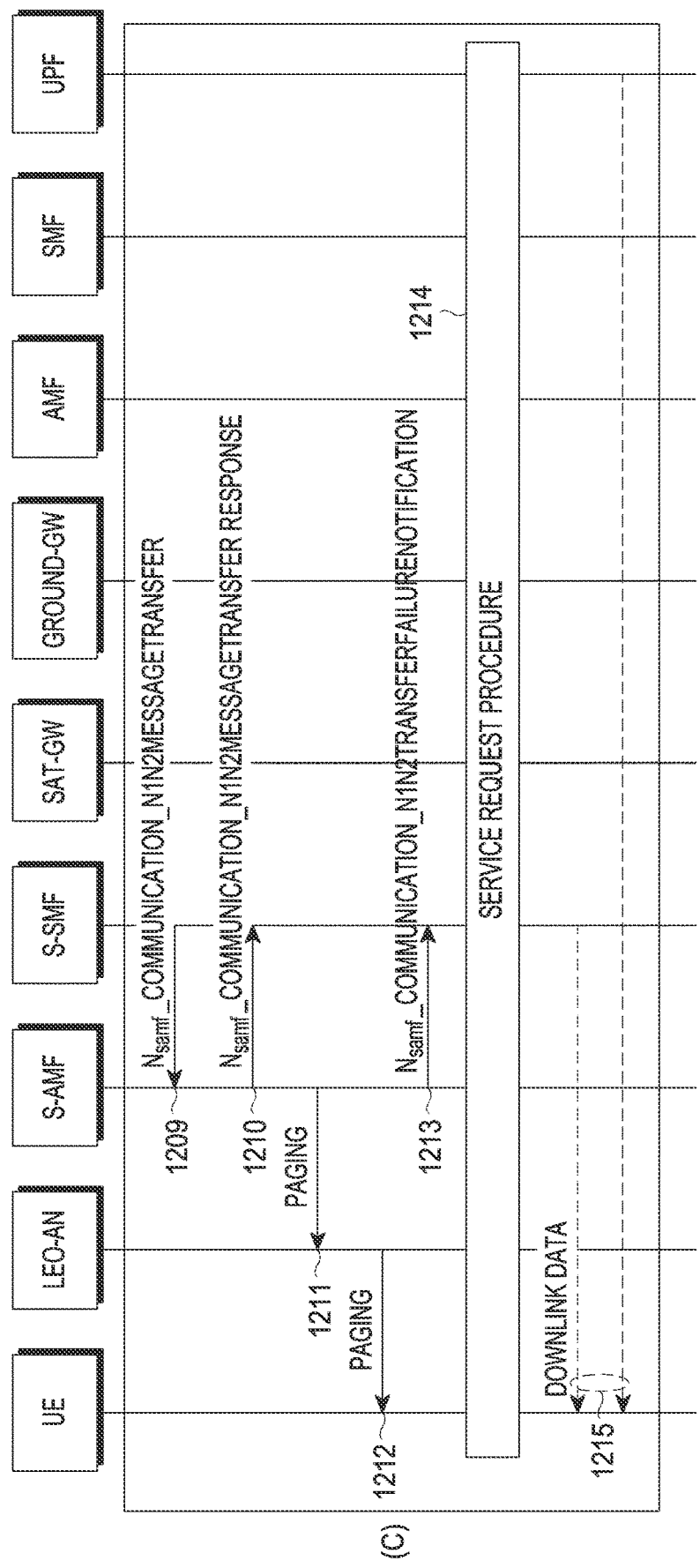

FIGS. 12A and 12B are flowcharts illustrating a network trigged service request procedure in a wireless communication system using a satellite according to various embodiments of the disclosure.

Referring to FIGS. 12A and 12B, an LEO-AN is exemplified as, for example, a case that a satellite base station is mounted on a low-orbit satellite. This is just an example, and the satellite base station may be mounted on a geostationary satellite. An S-AMF and an S-SMF are SNFs which constitute an SCN according to the disclosure, and the S-AMF and the S-SMF may be included in a same satellite or may be included in different satellites within the SCN. An SAT-GW and a GROUND-GW correspond to the above-described satellite gateway and ground gateway. An AMF, an SMF, and an UPF are NFs constituting a TCN. A basic operation performed in a service procedure using messages transmitted and received between NFs and SNFs in FIGS. 12A and 12B may refer to an operation using corresponding messages defined in a TS 23.502 V16.x.x standard in a 3GPP standard. A procedure (A) (e.g., operations 1201 to 1206) in FIG. 12A represents an operation of identifying a location of a UE (i.e., an operation of identifying that the UE is controlled by an S-AMF) after buffering downlink data to be transmitted to the UE in an UPF. A procedure (B) (e.g., operation 1208) in FIG. 12A represents a process in which first downlink data to be transmitted to the UE is piggybacked to a data notification message to be transmitted to the UE and the data notification message is delivered to an S-SMF to which the UE belongs, and a satellite on which the S-SMF is mounted buffers the first downlink data in an internal buffer as described in an example in FIG. 11. A procedure (C) (e.g., operations 1209 to 1215) in FIG. 12B represents an operation of identifying a satellite serving a UE (i.e., a satellite on which an LEO-AN serving the UE is mounted) via paging, and then delivering, to the UE, the buffered first downlink data from the S-SMF and subsequent downlink data from an UPF.

Location Update

In a wireless communication system using a satellite, in order to provide a UE with a continuous mobile network service, if the UE moves out of a coverage of an old SCN to which the UE belongs due to movement of the UE or movement of the satellite, a registration procedure is required for a new SCN to which the UE moves or the UE is moved for mobility management.

Figure 13:
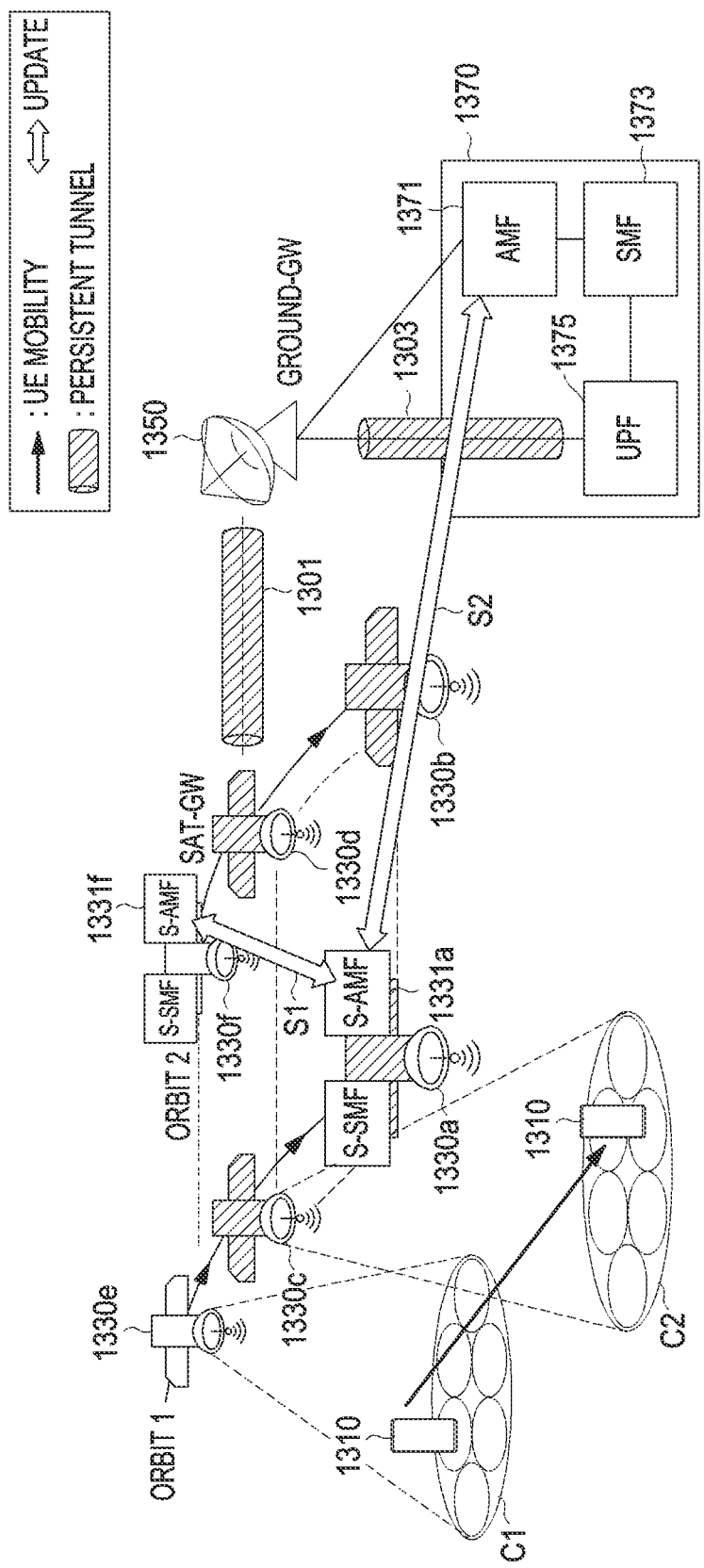
FIG. 13 is a diagram for describing a communication method for registering a UE in a new SCN in a wireless communication system using a satellite according to an embodiment of the disclosure.

FIG. 13 is a diagram for describing a communication method for registering a UE in a new SCN in a wireless communication system using a satellite according to an embodiment of the disclosure.

Referring to FIG. 13, a plurality of satellites 1330a, 1330b, . . . , 1330f exist in a satellite constellation environment, and the plurality of satellites 1330a, 1330b, . . . , 1330f may include a base station function for a wireless access of a UE 1310. The satellites 1330a, 1330c, and 1330e may move along a first orbit ORBIT1 or may be fixed to an orbit in a case of a geostationary orbit, and the satellites 1330b, 1330d, and 1330f may move along a second orbit ORBIT2 or may be fixed to an orbit in a case of a geostationary orbit. An example in FIG. 13 represents an example in which, among the plurality of satellites 1330a, 1330b, . . . , 1330f, first satellites 130a, 1330b, 1330c, and 1330d belong to an SCN1, and second satellites 1330e and 1330f belong to an SCN2. The satellite 1330a among the first satellites 130a, 1330b, 1330c, and 1330d which belong to the SCN1 includes an S-SMF and an S-AMF as SNFs which constitute the SCN1, and the satellite 1330f of the second satellites 1330e and 1330f which belong to the SCN2 includes an S-SMF and an S-AMF as SNFs which constitute the SCN2. The satellite 1330d operates as a SAT-GW for communicating with a GROUND-GW 1350, the GROUND-GW 1350 is connected to a TCN 1370, and the TCN 1370 includes an AMF 1371, an SMF 1373, an UPF 1375, and/or the like. Persistent GTP-U tunnels 1301 and 1303 which are persistently (or semi-persistently) maintained to be shared by a plurality of UEs are used for a path among the SAT-GW, the GROUND-GW 1350, and the UPF 1375. An example in FIG. 13 represents a state in which a UE 1310 moves out of a coverage C1 of the satellite 1330e in the SCN2 due to movement of the UE 1310 and moves to a coverage C1 of the satellite 1330c in the SCN1. In the example in FIG. 13, the UE 1310 requests registration from an S-AMF 1331a of the SCN1 via the satellite 1330c as the UE 1310 moves to the coverage C1 of the satellite 1330c. The registration request of the UE 1310 is delivered to the S-AMF 1331a within the satellite 1330a via the satellite 1330c which operates as an LEO-AN. Information of the UE 1310 managed by an S-AMF 1331f of the SCN2 is delivered to the S-AMF 1331a of the SCN1 (S1), and the S-AMF 1331a of the SCN1 provides the AMF 1371 of the TCN 1370 with current location information of the UE 1310 to update location information of the UE 1310. The location information of the UE 1310 is delivered to the AMF 1371 of the TCN 1370 via the S-AMF 1331a, the SAT-GW, and the GROUND-GW 1350.

Meanwhile, in a case that a UE moves out of a coverage of an old SCN to which the UE belongs due to movement of a satellite to a coverage of a new SCN, as described in an example in FIG. 13, a registration procedure for the new SCN is required. In a registration procedure of a UE due to movement of a satellite, registration requests simultaneously occur from a plurality of UEs within a coverage of a new SCN. In this case, in the disclosure, a registration procedure may be performed more efficiently by aggregating and updating information of the plurality of UEs without individually updating information of the plurality of UEs within the coverage of the new SCN.

Figure 14:
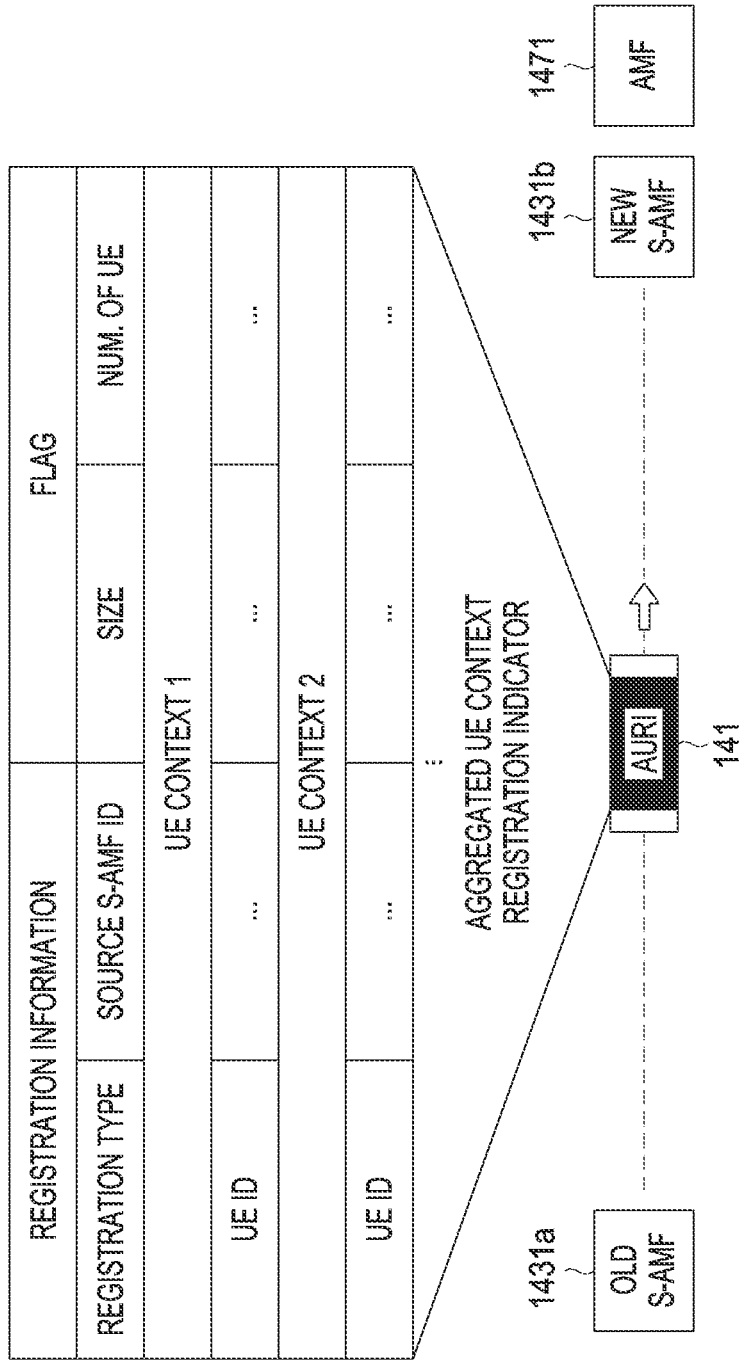
FIG. 14 is a diagram illustrating a communication method for registering a UE in a new SCN in a wireless communication system using a satellite according to an embodiment of the disclosure.

FIG. 14 is a diagram illustrating a communication method for registering a UE in a new SCN in a wireless communication system using a satellite according to an embodiment of the disclosure.

Referring to FIG. 14 may be used in a registration procedure for performing an update by aggregating information of a plurality of UEs moved from a coverage of an old SCN to a coverage of a new SCN according to movement of a satellite. To this end, in the disclosure, an aggregated UE context registration indicator (AURI) 141 is included as information indicating registration of a plurality of UEs in an update message delivered from an old S-AMF 1431a of the old SCN to a new S-AMF 1431b of the new SCN. The AURI 141 may include registration information and a flag, as illustrated in FIG. 14. Information of each UE is sequentially added to the flag. In addition, the registration information may include a registration type indicating registration of aggregated UE information and an ID of a source S-AMF (i.e., an old S-AMF) which delivers the AURI 141. The flag includes information indicating a size of a corresponding update message and the number of UEs for which registration procedures are required. A new S-AMF 1431b may provide an AMF 1471 of a TCN with aggregated current location information of a plurality of UEs via the AURI 141 to update location information of a UE 1310. According to a registration procedure using the AURI 141 in the disclosure, it is possible to reduce a delay and control traffic overhead during a registration procedure for a plurality of UEs due to movement of a satellite. A registration procedure due to movement of a UE described in FIG. 13 and a registration procedure due to movement of a satellite described in FIG. 14 may be selectively performed or may be performed in combination according to a network situation.

Figure 15:
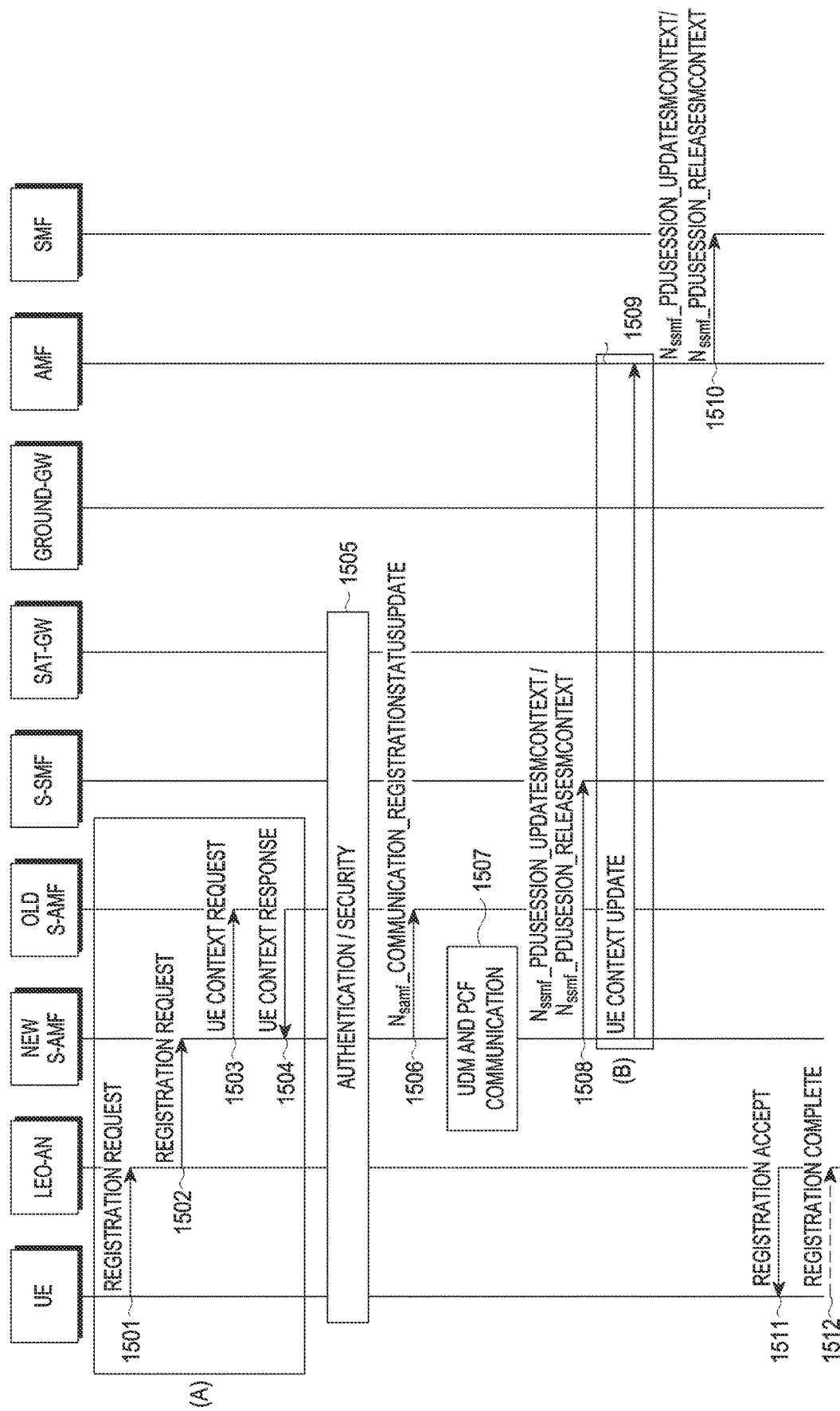
FIG. 15 is a flowchart illustrating a registration procedure of a UE in a wireless communication system using a satellite according to an embodiment of the disclosure.

FIG. 15 is a flowchart illustrating a registration procedure of a UE in a wireless communication system using a satellite according to an embodiment of the disclosure.

Referring to FIG. 15, a procedure (A) (e.g., operations 1501 to 1504) is an operation in which an old S-AMF delivers information of a UE to a new S-AMF according to movement of the UE or a satellite. The UE transmits a registration request to an LEO-AN in operation 1501, and the LEO-AN delivers the registration request received from the UE to a new S-AMF in operation 1502. The new S-AMF requests the old S-AMF to provide information of the UE (i.e., an UE context) which transmits the registration request to the old S-AMF in operation 1503, and the old S-AMF provides the new S-AMF with the information of the UE (i.e., the UE context) as a response in operation 1504. In operation 1503, the new S-AMF recognizes registration requests according to movement of the satellite when receiving the registration requests from a plurality of UEs according to the movement of the satellite (for example, when the number of registration requests received from the plurality of UEs during set time is greater than or equal to a threshold value), and request the old S-AMF to provide information of a UE (i.e., a UE context) including an AURI 141 for the plurality of UEs as described in an example in FIG. 14. In this case, in operation 1504, the old S-AMF may provide the new S-AMF with the information of the UE (i.e., the UE context) including the AURI 141 as a response.

Thereafter, in operation 1505, an authentication and security procedure is performed in the new SCN for the registration request of the UE(s). In operation 1506, the new S-AMF transmits a registration status update message informing the old S-AMF that the registration of the UE(s) has been completed in the new S-AMF. In operation 1507, the new S-AMF performs a communication to select an UDM and a PCF according to the registration of the UE(s). In operation 1508, the new S-AMF transmits, to an S-SMF, a message for a PDU session update for (re)activation of a PDU session(s) according to the registration of the UE(s) (that is, for connection activation of a corresponding PDU session(s) in a user plane), and transmits, to the S-SMF, a message for a PDU session release for deactivation of a corresponding PDU session(s) if there is the corresponding PDU session(s) which is not included in a PDU session(s) to be (re)activated according to the registration of the UE(s).

Thereafter, in a procedure (B) (e.g., operation 1509) in FIG. 15, the new S-AMF provides an AMF of a TCN with information of the UE(s) including changed TA information (i.e., changed SCN information) for updating the changed TA information (i.e., the changed SCN information) according to the registration of the UE(s). At this time, if the registration of the UE(s) is due to the movement of the satellite, the above-described AURI may be provided to the AMF of the TCN. In operation 1510, the AMF of the TCN transmits, to an SMF of the TCN, a message for a PDU session update for (re)activation of a PDU(s) (i.e., for connection activation of a corresponding PDU session(s) in the user plane) according to the registration of the UE(s) based on the changed TA information (i.e., the changed SCN information) according to the registration of the UE(s) which is received from the new S-AMF or the AURI, and transmits, to the SMF of the TCN, a message for a PDU session release for deactivation of a corresponding PDU session(s) if there is the corresponding PDU session(s) which is not included in a PDU session(s) to be (re)activated according to the registration of the UE(s). According to operations 1508 and 1510, the (re)activated PDU session(s) is the same as the deactivated PDU session(s). In operation 1511, an LEO-AN transmits, to the UE which transmits the registration request, a message informing registration acceptance. In operation 1512, the UE which receives the message informing the registration acceptance transmits, to the LEO-AN, a message informing registration completion as an acknowledgment response.

Mobility Management

FIGS. 16A and 16B are diagrams illustrating a case that a location update occurs due to mobility of a satellite in a wireless communication system using the satellite according to an embodiment of the disclosure.

Referring to FIGS. 16A and 16B, show a case that when time t is t=1 and t=2, respectively, there is no change in movement of a UE enough to cause a location update, but an SCN which controls the UE is changed from an SCN1 1601 to an SCN2 1603 according to mobility of a satellite. In this case, even if there is no mobility of the UE, the location update of the UE may be required according to the mobility of the satellite.

Figure 17:
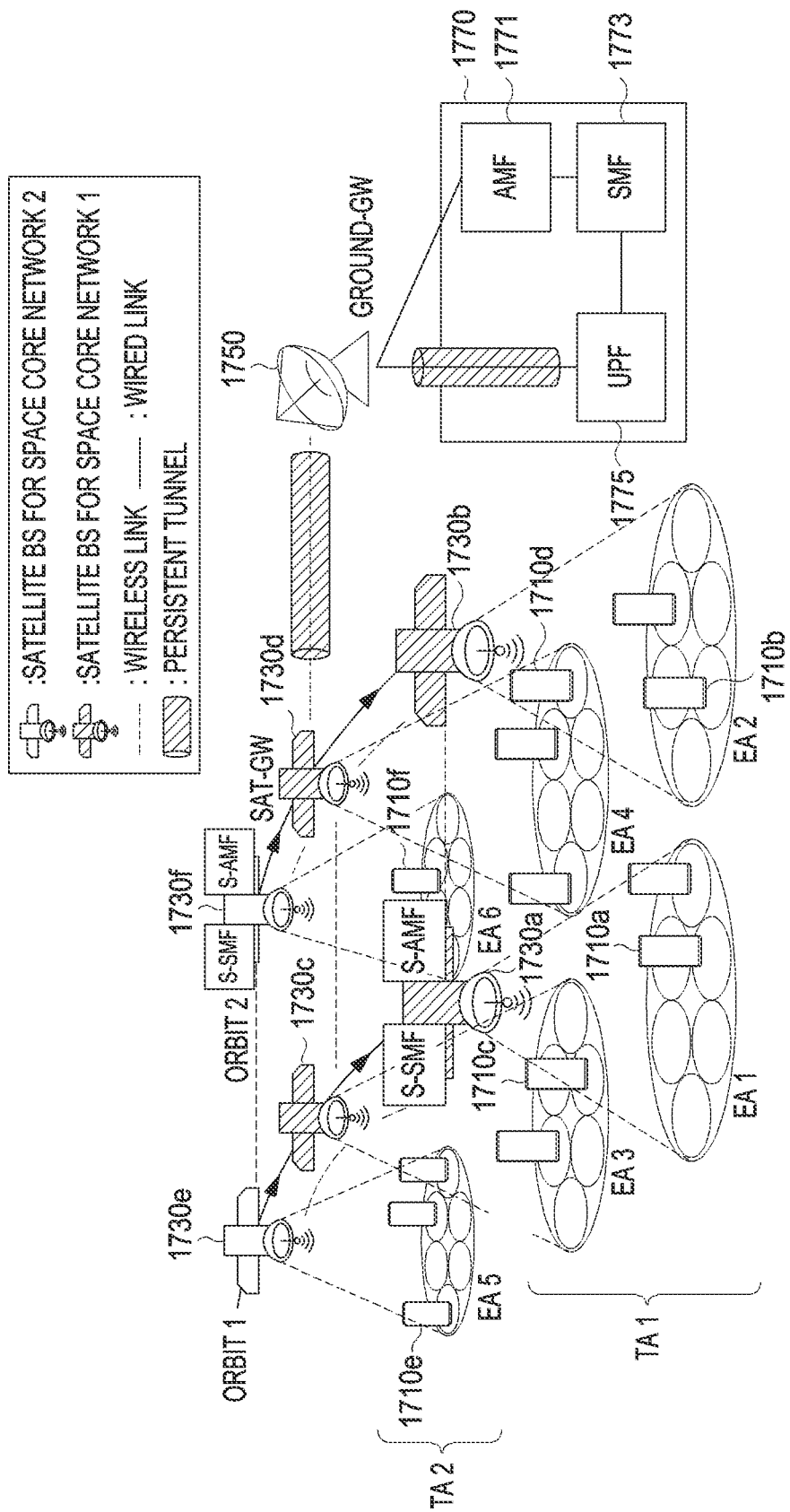
FIG. 17 is a diagram for describing mobility management using a tracking area (TA) and an earth fixed area (EA) in a wireless communication system using a satellite according to an embodiment of the disclosure.

FIG. 17 is a diagram for describing mobility management using a tracking area (TA) and an earth fixed area (EA) in a wireless communication system using a satellite according to an embodiment of the disclosure.

Referring to FIG. 17 represents an example in which, among a plurality of satellites 1730a, 1730b, . . . , 1730f including a base station function for a wireless access of a plurality of UEs 1710a, 1710b, . . . , 1710f, the satellites

1730a, 1730b, 1730c, and 1730d belong to an SCN1, and the satellites 1730e and 1730f belong to an SCN2. Among the satellites 1730a, 1730b, 1730c, and 1730d belonging to the SCN1, the satellite 1730a may include an S-SMF and an S-AMF as SNFs constituting the SCN1. The satellite 1730f of the satellites 1730e and 1730f belonging to the SCN2 may include an S-SMF and an S-AMF as SNFs constituting the SCN2. In the example in FIG. 17, the satellite 1730d of the SCN1 operates as an SAT-GW for communicating with a GROUND-GW 1750. The GROUND-GW 1750 is connected to a TCN 1770, and the TCN 1770 includes an AMF 1771, an SMF 1773, and an UPF 1775. Although not shown, the TCN 1770 may include an UDM for managing subscription information of a UE, and/or the like. A persistent GTP-U tunnel may be used for a path among the satellite 1730d, the GROUND-GW 1750, and the UPF 1775.

In the example in FIG. 17, if the UE is moved/moves out of a coverage range of an SCN which the UE accesses to a coverage of a new SCN (for example, the UE is moved/moves from a coverage of the SCN2 to a coverage of the SCN1) according to mobility of the satellite or mobility of the UE, a continuous mobile network service may be provided to the UE via service movement between the SCN1 and the SCN2. In the example in FIG. 17, a TA1 and a TA2 mean areas covered by satellites controlled by the SCN1 and the SCN2, respectively, and the areas may be changed according to mobility of the satellites. Each of EA1 to EA6 means a fixed area on a ground, and is not changed regardless of mobility of a UE and a satellite.

In the disclosure, the UDM of the TCN 1770 may add information of the EA and information of the TA to a UE profile (e.g., a UE profile), and the AMF 1771 of the TCN 1770 may manage the mobility of the UE based on at least one of the information of the EA and the information of the TA. For example, a UE with relatively low mobility may manage mobility based on the EA, and a UE with relatively high mobility may manage mobility based on the TA. Further, various criteria for determining a degree of the mobility of the UE may be preset.

In the disclosure, the AMF 1771 of the TCN 1770 may know matching relation between a satellite whose beam coverage overlaps with the EA every hour based on mobility of a satellite with consistent mobility (that is, moves to a determined location at determined time). Via this, if there is downlink data to be transmitted to a UE whose mobility is managed by the EA, the downlink data may be transmitted to the UE by delivering the downlink data to the satellite whose beam coverage overlaps with the EA to which the UE belongs. If there is downlink data to be transmitted to a UE whose mobility is managed by the TA, the downlink data is first delivered to an SCN, and then the SCN delivers the downlink data to a satellite serving the UE via paging to transmit the downlink data to the UE.

FIGS. 18A and 18B are diagrams for describing mobility management based on an EA in a wireless communication system using a satellite according to an embodiment of the disclosure.

Referring to FIGS. 18A and 18B, show a case that when time t is t=1 and t=2, respectively, there is no change in movement of a UE enough to cause a location update, so an EA is maintained as an EA1, and a TA to which the UE belongs is changed from a TA1 to a TA2 and an SCN which controls the UE is changed from an SCN1 1801 to an SCN21803 according to mobility of a satellite. In an illustrated situation in FIGS. 18A and 18B, if mobility is managed based on mobility of the UE, signaling is required for delivering information of the UE for mobility management between an S-AMF1 1831a of the SCN1 1801 and an S-AMF2 1831b of the SCN2 1803, however, EA information of the UE is not changed in an AMF 1871 of a TCN, so signaling is not required for mobility management between the AMF 1871 of the TCN and the S-AMF2 1831b of the SCN2 1803. According to the disclosure, control overhead in mobility management due to mobility of a satellite may be reduced.

Figure 19:
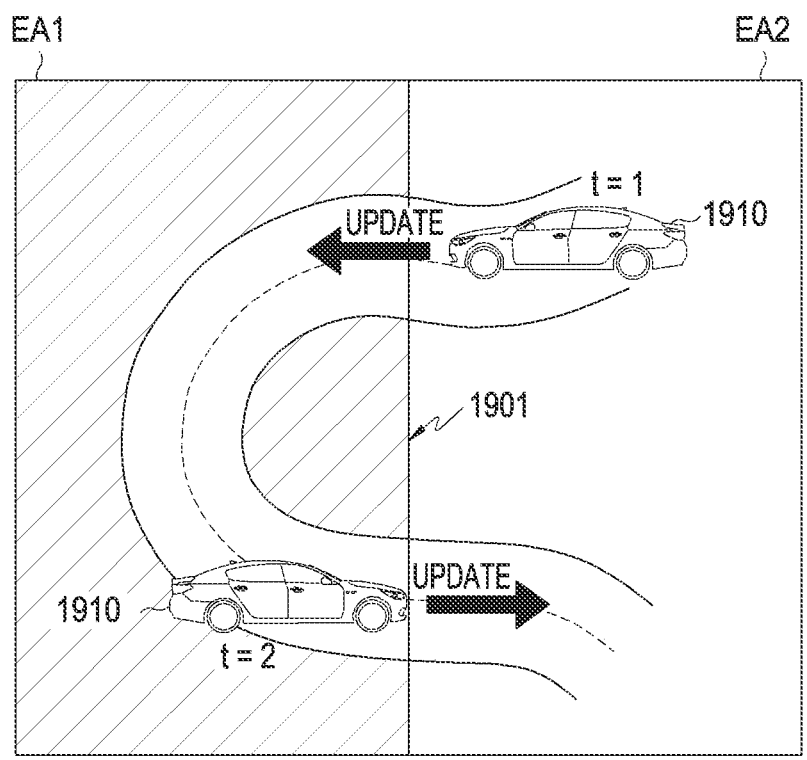
FIG. 19 is a diagram for describing a situation which may occur during mobility management based on only an EA in a wireless communication system using a satellite according to an embodiment of the disclosure.

FIG. 19 is a diagram for describing a situation which may occur during mobility management based on only an EA in a wireless communication system using a satellite according to an embodiment of the disclosure.

Referring to FIG. 19, in a UE 1910 (e.g., a UE mounted on a vehicle) moving near a boundary 1901 between an EA1 and an EA2 (for example, the UE 1910 moves from the EA2 to the EA1 at time t1 and moves from the EA1 to the EA2 at time t2), a location report to an AMF of a TCN frequently occurs due to movement between EAs. In this case, if mobility is managed based on a TA, not an EA, it is possible to reduce overhead of location reporting to the AMF of the TCN which frequently occurs. Therefore, if location reporting to the AMF of the TCN is performed by appropriately applying an EA and a TA according to a location and mobility of the UE, it is possible to reduce overhead of control traffic for location reporting. The disclosure proposes a scheme in which at least one of an AMF of a TCN and an AMF of an SCN adaptively determines a criterion (e.g., an EA and a TA) for managing mobility of a UE per UE to reduce overhead which occurs when reporting a location of the UE to the AMF of the TCN through SCN.

FIGS. 20A, 20B, 20C, and 20D are diagrams for describing a method of managing mobility by adaptively using an EA and a TA in a wireless communication system using a satellite according to various embodiments of the disclosure.

Figure 20A:
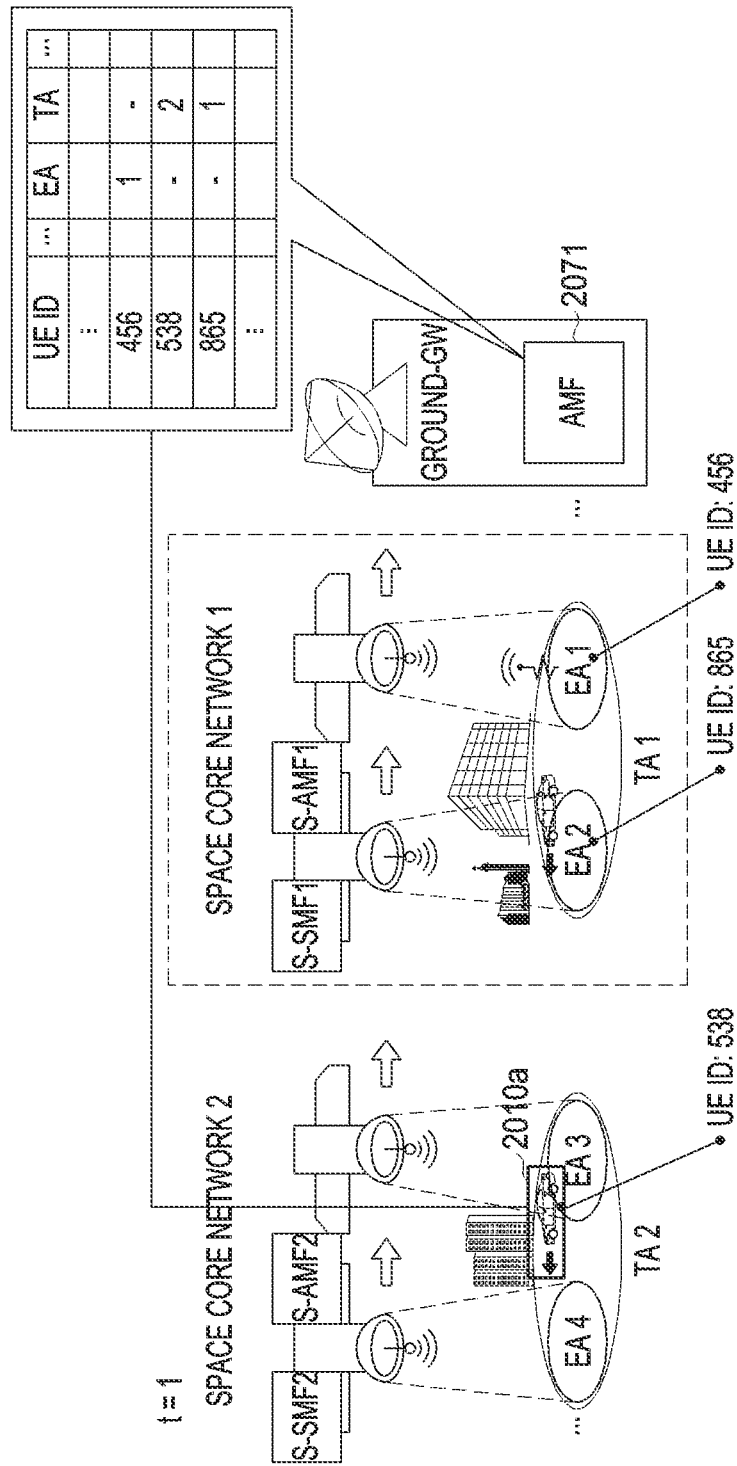
FIGS. 20A, 20B, 20C, and 20D are diagrams for describing a method of managing mobility by adaptively using an EA and a TA in a wireless communication system using a satellite according to various embodiments of the disclosure.
Figure 20B:
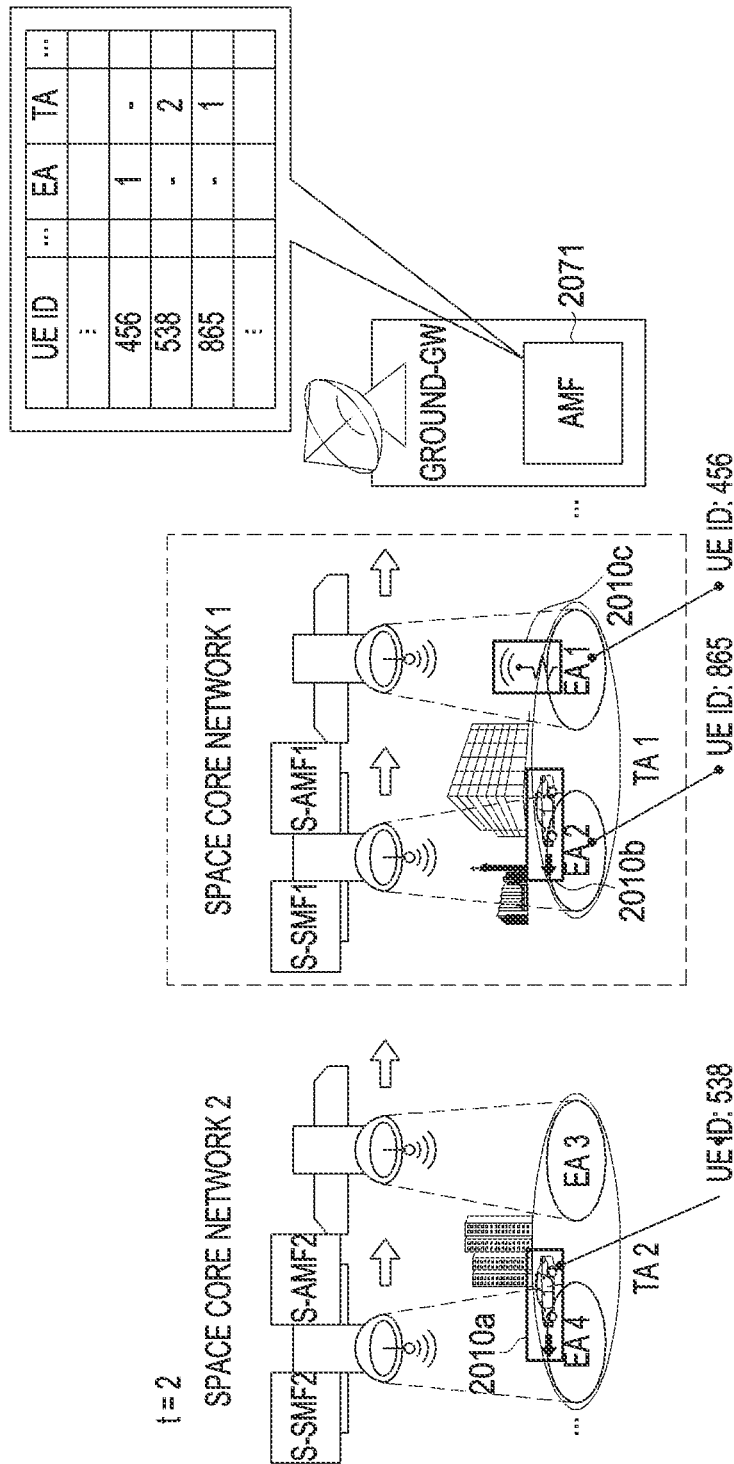
Figure 20C:
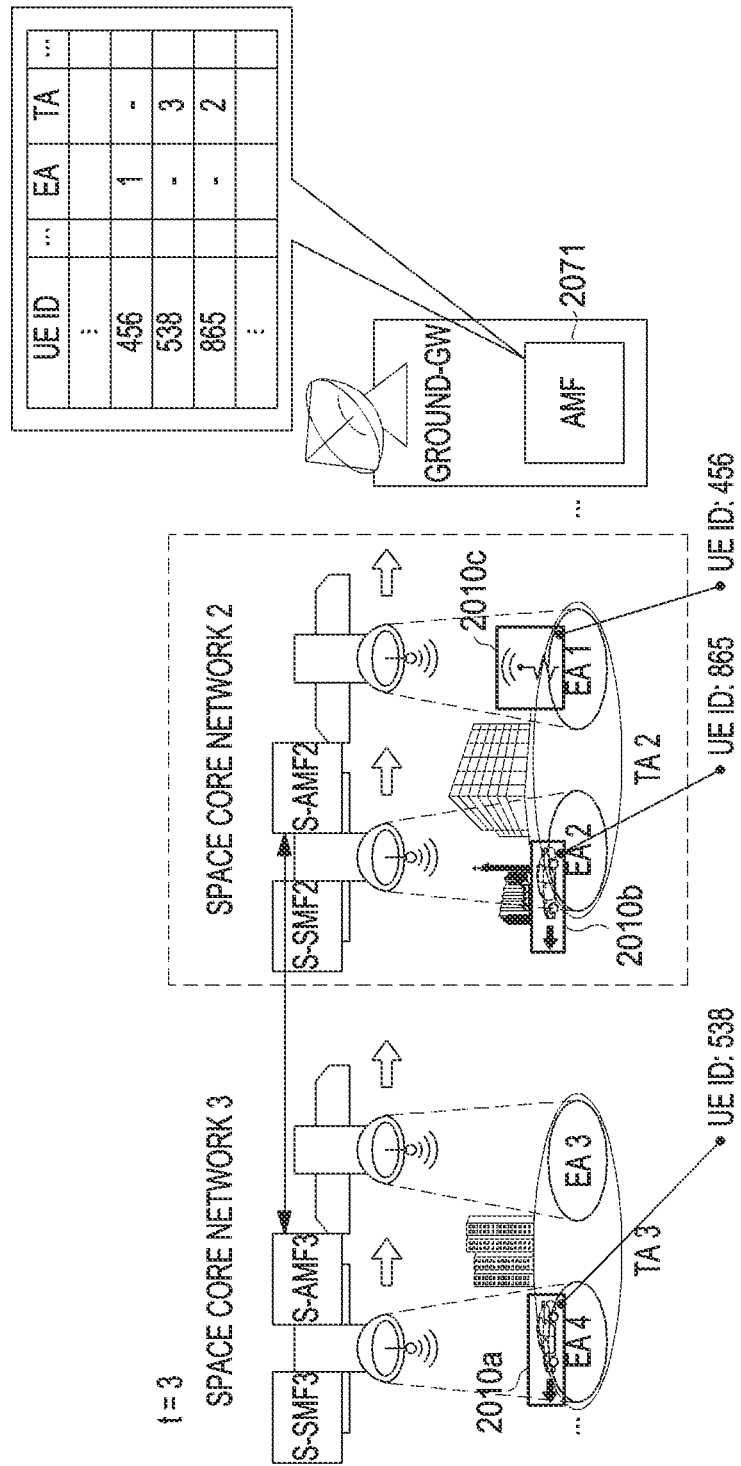
Figure 20D:
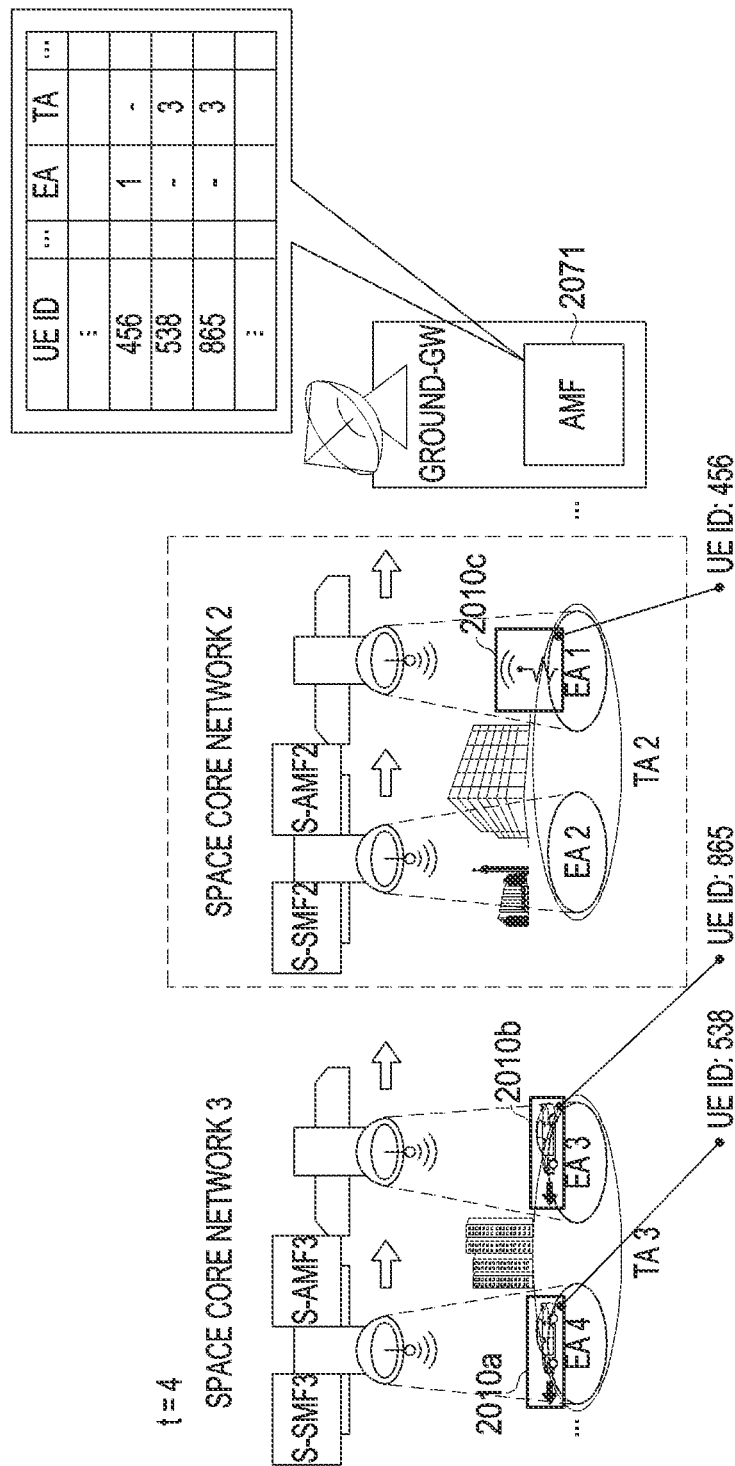

Referring to FIGS. 20A, 20B, 20C, and 20D, they show change status of a TA and an EA of UEs 2010a, 2010b, and 2010c (e.g., UE ID: 538, UE ID: 865, and UE ID: 456) at time t=1 to t=4, respectively. The UEs 2010a and 2010b exemplify UEs mounted on a vehicle, and the UE 2010c exemplifies a UE without change in an EA. Specifically, FIGS. 20A and 20B show a status that, from the time t=1 to t=2, there is no change in mobility of a satellite, and mobility of the UE 2010a does not change because a TA is maintained as a TA2, but an EA is changed from an EA3 to an EA4. In this status, according to the disclosure, in the UE 2010a whose mobility is controlled based on the TA, location reporting to an AMF 2071 of a TCN does not occur even though the EA changes. In other words, according to the disclosure, even though a satellite which the UE 2010a wirelessly accesses changes at time t=2 due to mobility of the UE 2010a, location reporting to the TCN via an SCN does not occur in the UE 2010a whose mobility is controlled based on the TA. FIGS. 20B and 20C show a status that, from time t=2 to t=3, an SCN and a TA of the UEs 2010a, 2010b, and 2010c (e.g., the UE ID: 538, UE ID: 865, and UE ID: 456) change due to mobility of a satellite. In this status, according to the disclosure, location reporting to the TCN (e.g., the AMF 2071) via the SCN occurs in the UEs 2010a and 2010b whose mobility is controlled by the TA because the TA changes, however, location reporting to the TCN (e.g., the AMF 2071) via the SCN does not occur in the UE 2010c whose mobility is controlled by the EA even though the TA changes. FIGS. 20C and 20D show a status that, from time t=3 to t=4, there is no movement of a satellite to an extent that a TA changes, but the TA of the UE 2010b changes due to movement of the UE 2010b (UE ID=538). In this status, location reporting to the TCN (e.g., the AMF

2071) via the SCN occurs in the UE 2010b whose mobility is controlled by the TA. As in the above embodiment of the disclosure, in the disclosure, it is possible to reduce occurrence of satellite-ground control traffic from an SCN to a TCN by controlling mobility by distinguishing between a UE whose mobility is controlled by a TA and a UE whose mobility is controlled by an EA. A scheme of distinguishing between the UE whose mobility is controlled by the TA and the UE whose mobility is controlled by the EA may be preset per UE, dynamically set according to a network situation, or set as a scheme shown in FIG. 21 below.

Figure 21:
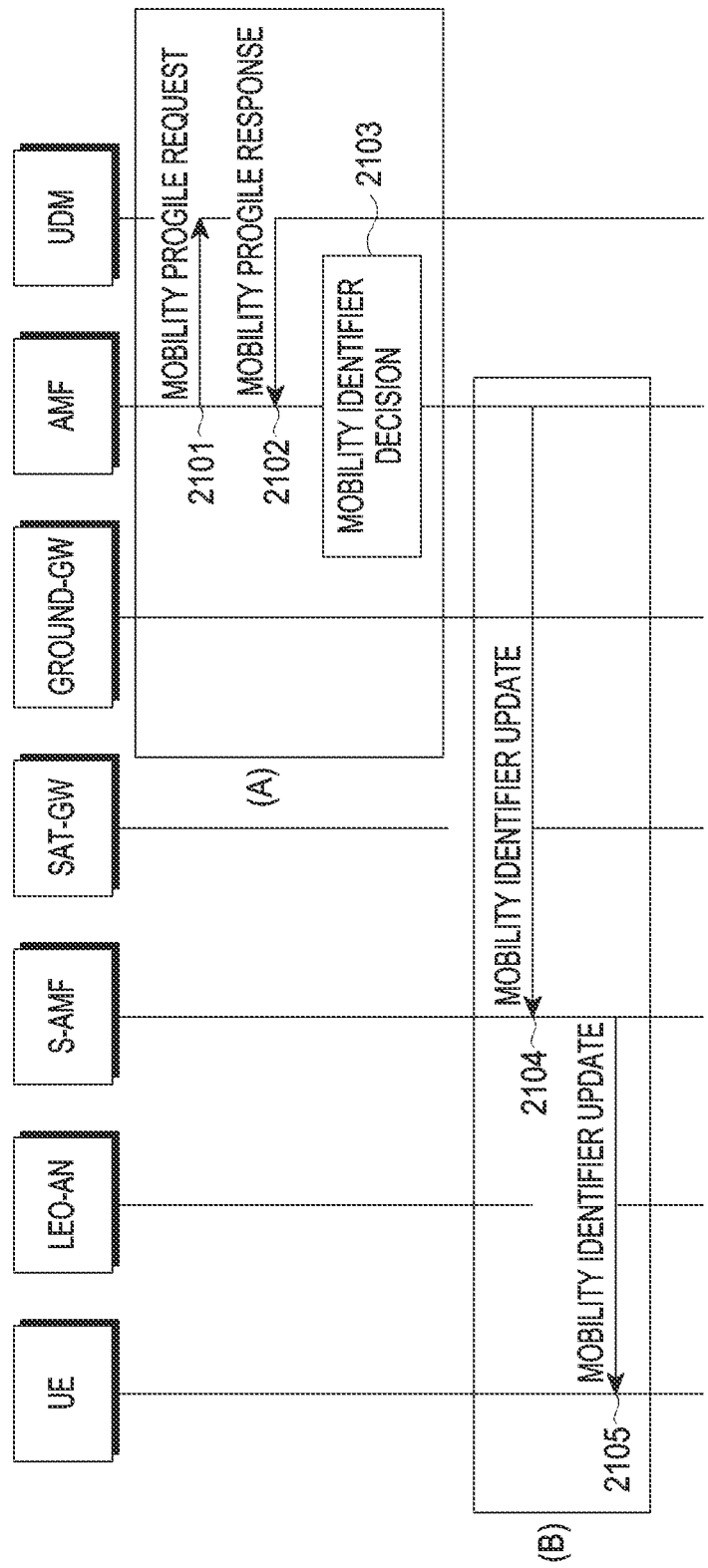
FIG. 21 is a flowchart illustrating a procedure for managing mobility of a UE in a wireless communication system using a satellite according to an embodiment of the disclosure.

FIG. 21 is a flowchart illustrating a procedure for managing mobility of a UE in a wireless communication system using a satellite according to an embodiment of the disclosure.

Referring to FIG. 21, an embodiment proposes a scheme of managing a mobility ID indicating whether an AMF of a TCN will control mobility of a UE based on a TA or will control the mobility of the UE based on an EA.

A procedure (A) in FIG. 21 (operations 2101 to 2103) represents an operation in which an AMF of a TCN requests, to an UDM, a mobility profile of a UE(s) including location history information for the UE(s) to receive the mobility profile of the UE(s), and sets/determines a mobility ID for each UE based on the received mobility profile. A procedure (B) in FIG. 21 (operations 2104 and 2105) represents an operation in which the AMF delivers, to an S-AMF of an SCN, the mobility ID for each UE set/determined in operation 2103 to update mobility for each UE, and the S-AMF provides the UE(s) with the updated mobility ID for each UE to request a location report of the UE(s). The procedures in FIG. 21 may be performed periodically, triggered when a predetermined condition is satisfied, or performed according to a request of a UE.

As described above, according to embodiments of the disclosure, it is possible to reduce a satellite-ground delay and overhead of control traffic which occur in a wireless communication system using a satellite. To evaluate performance of a scheme proposed in the disclosure, a satellite network environment is simulated by using a satellite network simulator 3 (SNS3) which is an open source and a network environment of a TCN is simulated via a 5G core (5GC), and specific simulation parameters are as examples in Table 1 below.

TABLE 1

| | |
|---|---|
| LEO satellite altitude | 2000 km |
| UE-satellite frequency band | 29.5 GHz-30 GHz (Uplink) |
| | 19.7 GHz-20.2 GHz (Downlink) |
| GW-satellite frequency band | 27.5 GHz-29.5 GHz (Uplink) |
| | 17.7 GHz-19.7 GHz (Downlink) |
| Data rate | 2 Mbps |
| Packet size | 350 Byte |

Table 2 below shows a comparison result for a reduction rate of a delay and a reduction rate of control traffic overhead in a case that an existing control procedure performed on a control plane defined in a 3GPP standard is applied in a satellite network simulation environment and a case that a control procedure proposed in the disclosure is applied in the satellite network simulation environment.

TABLE 2

| | Reduction in delay of control procedure | Reduction in control traffic overhead between satellite and ground |
|---|---|---|
| PDU session establishment | 7.6% | 40% |
| Network triggered service request | 15.1% | 37.5% |
| Location update | 25.6% | 42.8% |

If a scheme of a control procedure(s) proposed in embodiments of the disclosure is applied, it may be seen that a delay is reduced by up to 25.6% compared to an existing scheme, and control traffic overhead between a satellite and a ground is reduced by up to 42.8% compared to the existing scheme.

Figure 22:
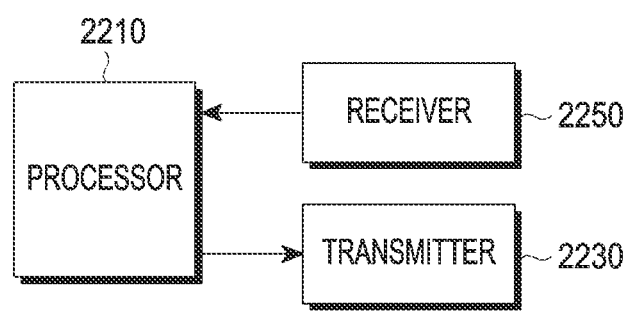
FIG. 22 is a block diagram illustrating a structure of a satellite according to an embodiment of the disclosure.

FIG. 22 is a block diagram illustrating a structure of a satellite according to an embodiment of the disclosure.

Referring to FIG. 22, a satellite may be a satellite on which a function of at least one of an LEO-AN, an S-AMF, an S-SMF, and an SAT-GW is mounted. The satellite in FIG. 22 may include a processor 2210 which controls an overall operation of the satellite to perform an operation in the disclosure according to a combination of two or more embodiments as well as each of embodiments in FIGS. 1 to 21, and a transmitter 2230 and a receiver 2250 for a wireless communication. The transmitter 2230 and the receiver 2250 may be referred to as a transceiver.

The methods according to the embodiments descried in the specification of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In specific embodiments of the disclosure described above, elements included in the disclosure are expressed in the singular or plural according to the specific embodiments. However, the singular or plural expression is appropriately selected for a situation presented for convenience of description, and the disclosure is not limited to the singular or plural elements. Even if the element is expressed in the plural, the element may be including the singular element, and even if the element is expressed in the singular, the element may be including the plural elements.

In the drawings illustrating methods according to the disclosure, the order of description is not necessarily identical to the order of execution, and some operations may be performed in a different order or simultaneously.

Some of the components shown in the drawings illustrating methods according to the disclosure may be omitted in such an extent as not to impair the gist or essence of the disclosure.

The methods in the disclosure may be performed in a combination of all or some of the embodiments described herein in such an extent as not to impair the gist or essence of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A satellite in a wireless communication system, the satellite comprising:
    a transceiver; and
    a processor configured to:
        identify a protocol data unit (PDU) session establishment request from a user equipment (UE),
        select a satellite gateway for communicating with a ground gateway, and
        request, via the transceiver, the satellite gateway to allocate a port number which is matched to identification information of a first general packet radio service (GPRS) tunneling protocol-user (GTP-U) tunnel to be used for transmission and reception of packets for a PDU session requested by the UE in a path between a satellite base station which the UE accesses and the satellite gateway,
    wherein the satellite includes a session management function within a space core network (SCN), and the packets are transmitted or received to and from a terrestrial core network (TCN) by using address information which is converted based on the port number.

2. The satellite of claim 1, wherein a second GTP-U tunnel to be used in a path between the satellite gateway and the TCN is a persistent GTP-U tunnel to be shared by a plurality of UEs.

3. The satellite of claim 1, wherein the processor is further configured to:
    identify whether a separate delivery path is required in a path between the satellite gateway and the TCN for the requested PDU session, and
    in case that the separate delivery path is required, select a separate GTP-U tunnel as the separate delivery path for the UE for the requested PDU session.

4. The satellite of claim 1, wherein the processor is further configured to:
    receive, from a second satellite including a mobility management function within the SCN, a request for modification of the first GTP-U tunnel for the PDU session, and
    request the satellite gateway to allocate a port number which is matched to identification information of a modified GTP-U tunnel.

5. The satellite of claim 1, wherein the processor is further configured to:
    after the PDU session for the UE is established, receive, from a session management function (SMF) of the TCN, a data notification message in which first downlink data to be transmitted to the UE is piggybacked, and
    buffer the received first downlink data, and deliver, to a satellite base station serving the UE which is identified via paging, the first downlink data.

6. The satellite of claim 1, wherein the PDU session is activated or deactivated based on mobility of the UE or mobility of the satellite.

7. A satellite gateway for communicating with a ground gateway in a wireless communication system, the satellite gateway comprising:
    a transceiver; and
    a processor configured to:
        receive, from a first satellite including a session management function within a space core network (SCN) via the transceiver, an allocation request for a port number which is matched to identification information of a first general packet radio service (GPRS) tunneling protocol-user (GTP-U) tunnel to be used for transmission and reception of packets for a protocol data unit (PDU) session which is requested by a user equipment (UE),
        allocate the port number which is matched to a first source internet protocol (IP) address which corresponds to the identification information of the first GTP-U tunnel, and
    manage a matching table including information in which the identification information of the first GTP-U tunnel is matched to the port number,
    wherein the first GTP-U tunnel is used in a path between a satellite base station which the UE accesses and the satellite gateway, and
    wherein the packets are transmitted or received to and from a terrestrial core network (TCN) by using address information which is converted based on the port number.

8. The satellite gateway of claim 7, wherein a second GTP-U tunnel to be used in a path between the satellite gateway and the TCN is a persistent GTP-U tunnel to be shared by a plurality of UEs.

9. The satellite gateway of claim 7, wherein the processor is further configured to:
    convert the first source IP address into a second source IP address including an IP address of the satellite gateway and the port number, and
    based on the converted second source IP address, transmit, to the ground gateway, an uplink packet of the UE by using the persistent GTP-U tunnel.

10. The satellite gateway of claim 9, wherein the processor is further configured to:
    convert the second source IP address including the port number into the first source IP address, and
    based on the converted first source IP address, transmit the downlink packet to be transmitted to the UE by using the first GTP-U tunnel.

11. A communication method in a wireless communication system using at least one satellite, the method comprising:
    identifying, by a first satellite including a session management function within a space core network (SCN), a protocol data unit (PDU) session establishment request from a user equipment (UE);
    selecting, by the first satellite, a satellite gateway for communicating with a ground gateway; and requesting, by the first satellite, the satellite gateway to allocate a port number which is matched to identification information of a first general packet radio service (GPRS) tunneling protocol-user (GTP-U) tunnel to be used for transmission or reception of packets for a PDU session requested by the UE in a path between a satellite base station which the UE accesses and the satellite gateway, wherein the packets are transmitted or received to and from a terrestrial core network (TCN) by using address information which is converted based on the port number.

12. The method of claim 11, wherein a second GTP-U tunnel to be used in a path between the satellite gateway and the TCN is a persistent GTP-U tunnel to be shared by a plurality of UEs.

13. The method of claim 11, wherein the selecting of the satellite gateway comprises:

identifying, by the first satellite, whether a separate delivery path is required in a path between the satellite gateway and the TCN for the requested PDU session; and in case that the separate delivery path is required, selecting, by the first satellite, a separate GTP-U tunnel as the separate delivery path for the UE for the requested PDU session.

14. The method of claim 11, further comprising:

receiving, by the first satellite from a second satellite including a mobility management function within the SCN, a request for modification of the first GTP-U tunnel for the PDU session; and requesting, by the first satellite, the satellite gateway to allocate a port number which is matched to identification information of a modified GTP-U tunnel.

15. The method of claim 11, further comprising:

after the PDU session for the UE is established, receiving, by the first satellite from a session management function (SMF) of the TCN, a data notification message in which first downlink data to be transmitted to the UE is piggybacked; and buffering, by the first satellite, the received first downlink data, and delivering, to a satellite base station serving the UE which is identified via paging, the first downlink data.

16. The method of claim 11, wherein the PDU session is activated or deactivated based on mobility of the UE or mobility of the satellite.

17. A communication method in a wireless communication system using at least one satellite, the method comprising:

receiving, by a satellite gateway for communicating with a ground gateway from a first satellite including a session management function within a space core network (SCN), an allocation request for a port number which is matched to identification information of a first general packet radio service (GPRS) tunneling protocol-user (GTP-U) tunnel to be used for transmission and reception of packets for a protocol data unit (PDU) session which is requested by a user equipment (UE); and allocating the port number which is matched to a first source internet protocol (IP) address which corresponds to the identification information of the first GTP-U tunnel, wherein the satellite gateway manages a matching table including information in which the identification information of the first GTP-U tunnel is matched to the port number, wherein the first GTP-U tunnel is used in a path between a satellite base station which the UE accesses and the satellite gateway, and wherein the packets are transmitted or received to and from a terrestrial core network (TCN) by using address information which is converted based on the port number.

18. The method of claim 17, wherein a second GTP-U tunnel to be used in a path between the satellite gateway and the TCN is a persistent GTP-U tunnel to be shared by a plurality of UEs.

19. The method of claim 17, further comprising:

converting, by the satellite gateway, the first source IP address into a second source IP address including an IP address of the satellite gateway and the port number; and based on the converted second source IP address, transmitting, to the ground gateway, an uplink packet of the UE by using the persistent GTP-U tunnel.

20. The method of claim 19, further comprising:

converting, by the satellite gateway, the second source IP address including the port number into the first source IP address; and based on the converted first source IP address, transmitting the downlink packet to be transmitted to the UE by using the first GTP-U tunnel.

* * * * *